(12) United States Patent
Shenfield et al.

(10) Patent No.: US 8,024,452 B2
(45) Date of Patent: Sep. 20, 2011

(54) DYNAMIC SYNDICATED CONTENT DELIVERY SYSTEM AND METHOD

(75) Inventors: Michael Shenfield, Richmond Hill (CA); Christopher Smith, Burlington (CA)

(73) Assignee: Research in Motion Limited, Waterloo, Ontario (CA)

( * ) Notice: Subject to any disclaimer, the term of this patent is extended or adjusted under 35 U.S.C. 154(b) by 1019 days.

(21) Appl. No.: 11/415,288

(22) Filed: May 2, 2006

(65) Prior Publication Data

US 2007/0260673 A1    Nov. 8, 2007

(51) Int. Cl.
G06F 15/173 (2006.01)
G06F 15/16 (2006.01)

(52) U.S. Cl. .................. 709/224; 709/246
(58) Field of Classification Search .......... 709/224, 709/246
See application file for complete search history.

(56) References Cited

U.S. PATENT DOCUMENTS

| | | | |
|---|---|---|---|
| 6,311,206 B1* | 10/2001 | Malkin et al. | 709/202 |
| 2002/0152318 A1* | 10/2002 | Menon et al. | 709/231 |
| 2003/0095540 A1 | 5/2003 | Mulligan et al. | |
| 2004/0073613 A1* | 4/2004 | Plewnia | 709/206 |
| 2004/0111476 A1* | 6/2004 | Trossen et al. | 709/206 |
| 2004/0203712 A1 | 10/2004 | Murai et al. | |
| 2006/0156256 A1* | 7/2006 | Lee | 715/857 |
| 2008/0137688 A1* | 6/2008 | Walsh | 370/498 |

FOREIGN PATENT DOCUMENTS

| | | |
|---|---|---|
| EP | 1555793 | 7/2005 |
| JP | 2003283898 | 10/2003 |
| JP | 2004312605 | 11/2004 |

OTHER PUBLICATIONS

JP Patent Application No. 2007-110608, Official Action dated Dec. 18, 2009.

* cited by examiner

*Primary Examiner* — Ario Etienne
*Assistant Examiner* — Hee Kim
(74) *Attorney, Agent, or Firm* — David R. Morris

(57) ABSTRACT

A dynamic syndicated content delivery system and method, the system having: a push proxy, the push proxy having: a deferred retrieval message store, the deferred retrieval message store adapted to storing deferred content for future delivery; a push agent, the push agent adapted to push content; and a push scheduler, the push schedule adapted to communicate with the push agent to schedule the pushing of content and further adapted to monitor a wireless network for network conditions; a push client, the push client having: a client push agent, the client push agent adapted to communicate with the push agent of the push proxy; a content pull broker, the content pull broker adapted to communicate with the deferred retrieval message store of the push proxy; a deferred retrieval manager, the deferred retrieval manager adapted to communicate with the content pull broker and the client push agent to pull content, the deferred retrieval manager further adapted to monitor a network and instruct the content pull broker to pull the content if the network conditions are favorable for receiving the deferred content; and a network status monitor adapted to monitor the status of the network; and the wireless network.

20 Claims, 19 Drawing Sheets

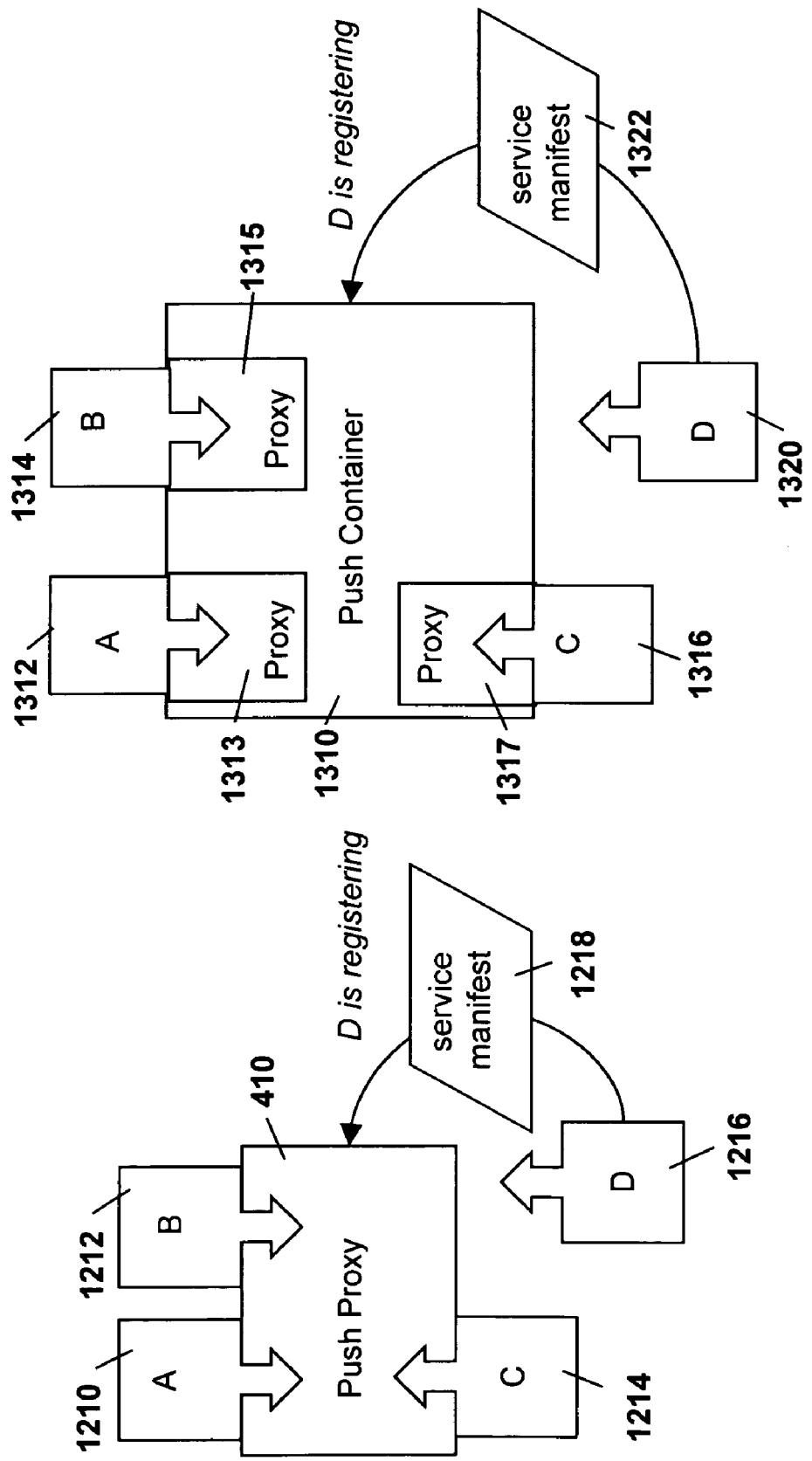

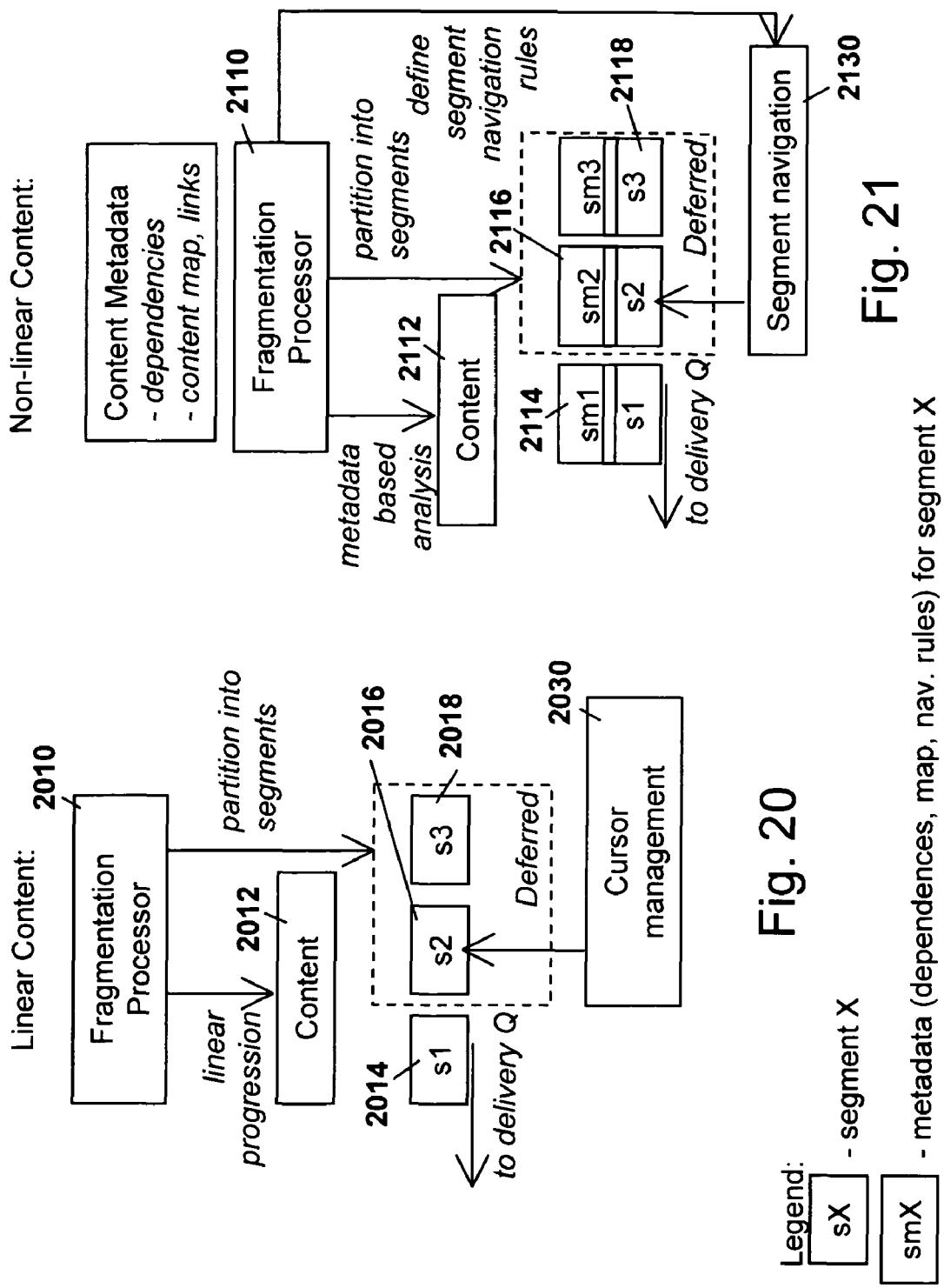

US 8,024,452 B2

DYNAMIC SYNDICATED CONTENT DELIVERY SYSTEM AND METHOD

FIELD OF THE INVENTION

The present method and system relate to dynamic content delivery in a mobile environment, and in particular to a generic dynamic content delivery architecture in which applications and content providers can be added without changing the architecture.

BACKGROUND

Users of mobile devices or mobile user equipment (UE) are increasingly becoming more sophisticated in terms of the functionality that they require from their mobile devices and the way that they access data from the mobile devices.

Dynamic content delivery allows users to have information or data pushed to them rather than having to go and seek out the data. Examples of data could include stock quotes, weather updates, traffic updates, dynamic wallpaper, ads, applications or other data desirable to a user.

Current technologies for mobile devices such as wireless application protocol (WAP) have the ability to push content; however, WAP requires websites to be rewritten to satisfy the wireless application protocol and provide users with a uniform site that does not change to accommodate a user's capabilities to view a site.

Other alternatives include SMS based push and broadcast or cell broadcast. In the broadcast case, delivery cannot be customized to the needs of a particular user or the capabilities of a particular device. These systems therefore have no intelligence associated with them. A better solution is required for mobile devices.

BRIEF DESCRIPTION OF THE DRAWINGS

The present application will be better understood with reference to the drawings, in which:

FIG. 12 is a block diagram showing a content provider registering with a single shared push proxy;

FIG. 13 is a block diagram showing a content provider registering with a push container managing a pool of push proxies;

FIG. 20 is a block diagram of a linear fragmentation process;

FIG. 21 is a block diagram of a non-linear fragmentation process; and

DETAILED DESCRIPTION OF THE DRAWINGS

Figure 1:
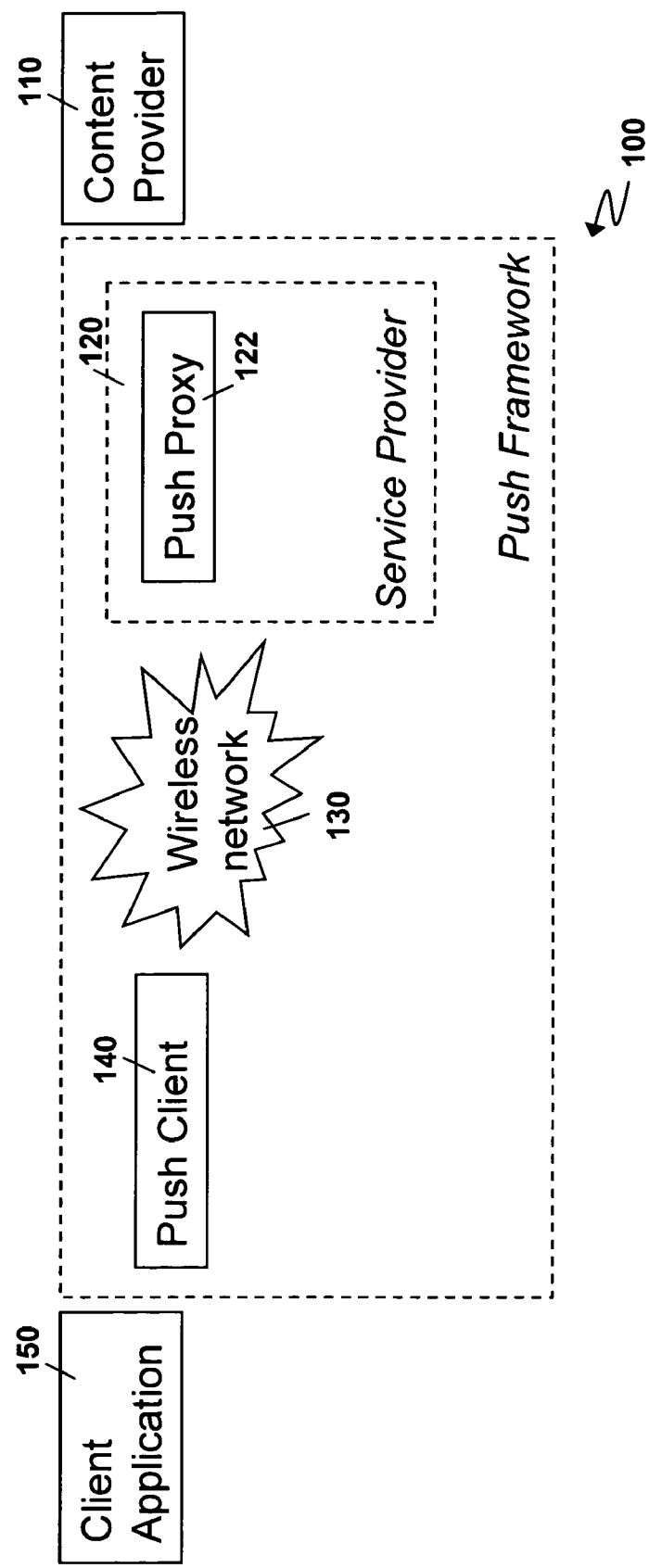
FIG. 1 is a block diagram of a basic architecture for a dynamic content delivery system.

The present system and method provide for a dynamic content delivery architecture and system that allows generic applications and content providers to be added to the system without the necessity to modify the architecture. Specifically, the present system and method allows for a mobile device to become a dynamic application platform in which applications can be added and content provided to the mobile device, where the architecture of the dynamic content delivery system does not limit the type of application that can be installed on the device nor the type of content that the device receives.

In one aspect of the present application, metadata is provided and associated with the content to add intelligence to the content for various processing elements within the dynamic content delivery architecture. This architecture includes logical components that provide for content provision, service provision including push proxies, a wireless network, push client and client applications.

In a further aspect of the present application, metadata is provided in a layered "enveloped" model for push content metadata. Content is wrapped with metadata that can be used for processing at each element within a push framework. The metadata for each successive element is layered, thereby allowing the processing element to extract only the metadata for that element. For example, a content package that includes metadata directed to a push proxy and a client application can include the content with a first level of metadata for the client application, and a second layer of metadata for the push proxy. Thereby, when the envelope reaches the push proxy, the metadata for the push proxy is extracted and applied to the content, and the modified content and metadata for the client application is passed to further processing element.

In another aspect of the present application, the metadata can be split into static metadata (also referred to herein as channel metadata) and dynamic metadata (also referred to herein as content metadata). Static metadata is established preferably at the time of registration of both the application and the content provider. However, the channel metadata can be established at a later time. The channel metadata specifies processing rules that are specific to the type of content that is being delivered and the application requirements for content type.

Dynamic metadata is conversely associated with the specific content being passed.

In another aspect of the present application, a plug-in registration model is presented within the push framework. A generic push client and a push proxy are identified, each having various processing blocks or modules that allow these elements to process both content and metadata. These blocks can be directed to process either the content being passed, the metadata being passed or both the content and the metadata being passed.

Plug-in registration further provides for the passing of service manifests and application manifests to allow the establishment of channel metadata between a content provider and an application. Specifically, service manifests can be used for registering a content provider with the push framework, and an application manifest can be used for registering an application with the push framework.

In another aspect of the present application, a method for pushing syndicated content is provided which allows for the handling of data based on its priority and based on network factors including the cost for sending data, the type of network connected to or the users' preferences. An optional mixed push/pull model for syndicated content allows for either a push proxy to push content when network conditions become favorable or for a client to pull content when network conditions become favorable or when the user requires the content.

In order to accommodate various mobile devices, a further aspect of the present application provides for content fragmentation for content, including non-linear content fragmentation. Non-linear content fragmentation includes augmenting the content with metadata allowing the data to be recomposed once it has been passed to the client.

These and other aspects will be identified in more detail with respect to the drawings.

The present application therefore provides a dynamic syndicated content delivery system comprising: a push proxy, said push proxy having: a deferred retrieval message store, said deferred retrieval message store adapted to storing deferred content for future delivery; a push agent, said push agent adapted to push content; and a push scheduler, said push schedule adapted to communicate with the push agent to schedule the pushing of content and further adapted to monitor a wireless network for network conditions; a push client, said push client having: a client push agent, the client push agent adapted to communicate with the push agent of the push proxy; a content pull broker, said content pull broker adapted to communicate with the deferred retrieval message store of the push proxy; a deferred retrieval manager, said deferred retrieval manager adapted to communicate with said content pull broker and said client push agent to pull content, said deferred retrieval manager further adapted to monitor a network and instruct said content pull broker to pull said content if said network conditions are favorable for receiving said deferred content; and a network status monitor adapted to monitor the status of the network; and the wireless network.

The present application further provides a method for retrieving content from a push proxy by a push client, said content being deferred until network conditions are more favorable for delivery, said method comprising the steps of: monitoring a wireless network to determine whether conditions are favorable for retrieving said deferred content; pulling said deferred content to said push client when said network conditions are favorable.

The present application still further provides a method for delaying content delivery from a push proxy to a push client until more favorable network conditions exist, the method comprising the steps of: storing at a push proxy deferred content for future delivery; monitoring a wireless network at said push proxy to determine if conditions are favorable for delivery; and if conditions are favorable for said delivery, delivering said deferred content.

Reference is now made to FIG. 1. A generic push system for delivering dynamic content to a client application is illustrated. A system of FIG. 1 is a simplified system and shows logical components that need to be in a dynamic content delivery architecture; however, one skilled in the art will appreciate that other components could exist or that various components could be grouped together.

Architecture 100 includes a content provider 110. Content provider 110 is arranged to provide dynamic content to users that are subscribed with content provider 110. Examples can include, for example, a website selling books. A user may register with content provider 110 to obtain a list of newly released books within specified genres. Other examples could include news sites which might provide headlines to users on a periodic basis, traffic sites which might provide up-to-date traffic information to users during certain periods of the day, stock market sites which could provide updated stock quotes or currency exchange rates to users, among others.

As will be described in more detail below, content provider 110 registers with a service provider 120 in order to allow clients of the service provider to receive content from content provider 110. Service provider 120 includes a push proxy 122 that acts as a proxy for a client or a client application and provides a destination for content provider 110 to send content.

Service provider 120 communicates over wireless network 130 with a push client 140 that is located on a mobile device. Push client 140 will be described in more detail below. Push client 140 receives the content that is being delivered from content provider 110 and can communicate the content with a client application 150, which ultimately consumes the content.

Within the present specification, reference to content provider 110, service provider 120, push proxy 122, wireless network 130, push client 140 or client application 150 is a reference back to the architecture of FIG. 1.

Figure 2:
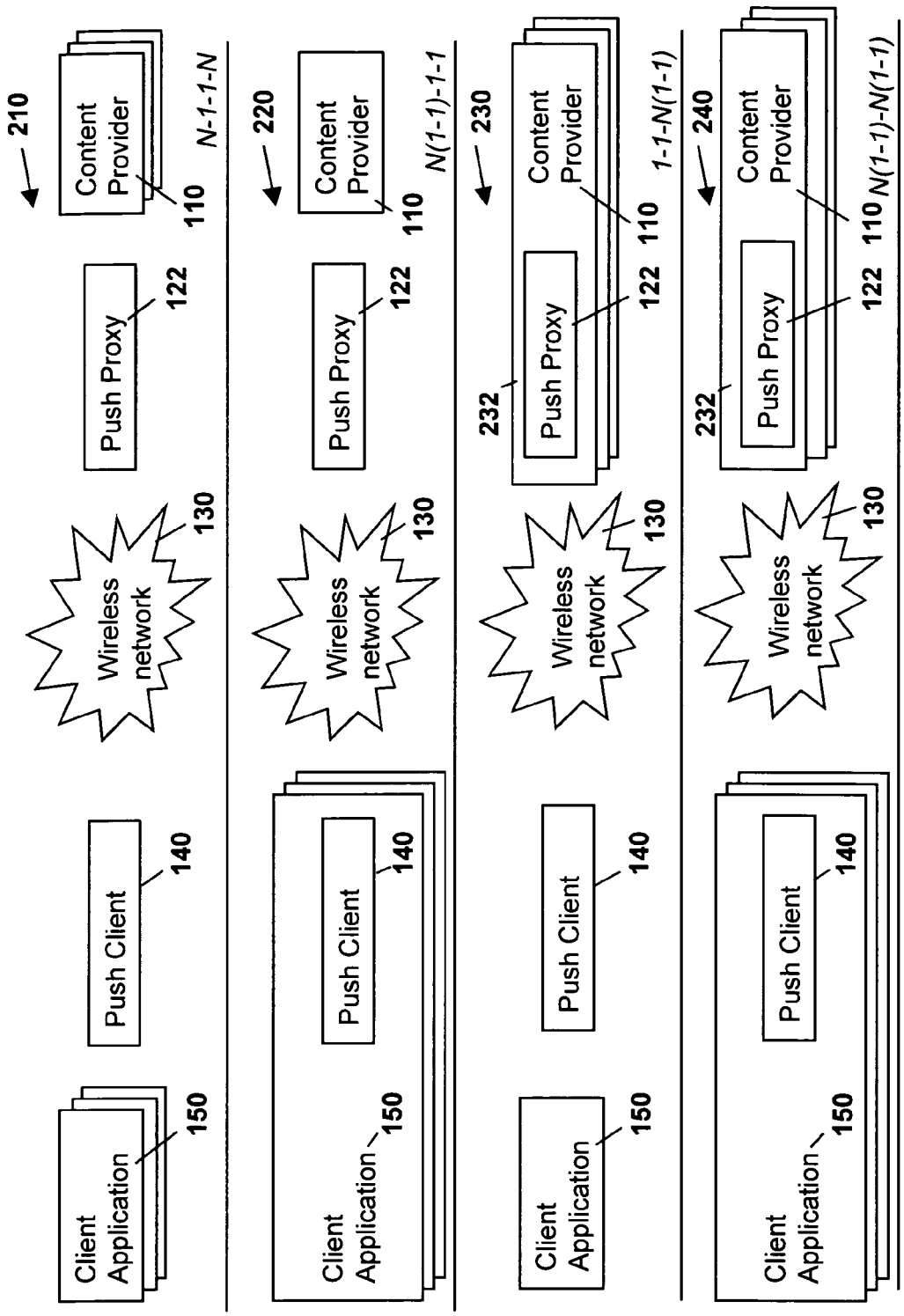
FIG. 2 is a block diagram showing alternative architectures of the dynamic content delivery system of FIG. 1.

Referring to FIG. 2, it will be appreciated by those skilled in the art that the components of FIG. 1 are merely logical components and are not necessarily separate physical components. FIG. 1 illustrates a generic architecture in which one content provider 110, one push proxy 122, one push client 140 and one client application 150 exist. Alternatives are illustrated in FIG. 2.

Specifically, a first alternative architecture 210 includes multiple content providers 110 communicating with a push proxy 122. Push proxy 122, as in the architecture of FIG. 1, communicates over wireless network 130 with a push client 140. Further, multiple client applications 150 exist in architecture 210. This is therefore an N-1-1-N system having multiple content providers 110 and multiple client applications 150.

Architecture 220 of FIG. 2 includes one content provider 110 communicating with and registered to push proxy 122. Further, push proxy 122 communicates over wireless network 130 with multiple push clients 140. Each push client 140 communicates with a client application 150. Architecture 220 therefore groups the logical components of a client application 150 and a push client 140 and is an N(1-1)-1-1 system.

Architecture 230 of FIG. 2 has multiple push proxies 122, each communicating with a content provider 110. Each push proxy and content provider combination 232 communicates over wireless network 130 with a generic push client 140, which in turn communicates with client application 150. This is an 1-1-N(1-1) system.

In architecture 240 of FIG. 2, a content provider 110 and push proxy 122 grouping 232 communicates over wireless network 130 with a generic push client 140 and client application 150 combination. This is therefore an N(1-1)-N(1-1) system.

As will be appreciated by those skilled in the art, other alternatives are possible. The above shows various logical components, which can be in separate physical components or grouped together. For example, a push client can be imbedded in an application, common shared clients can be used by multiple applications or other alternatives.

Figure 3:
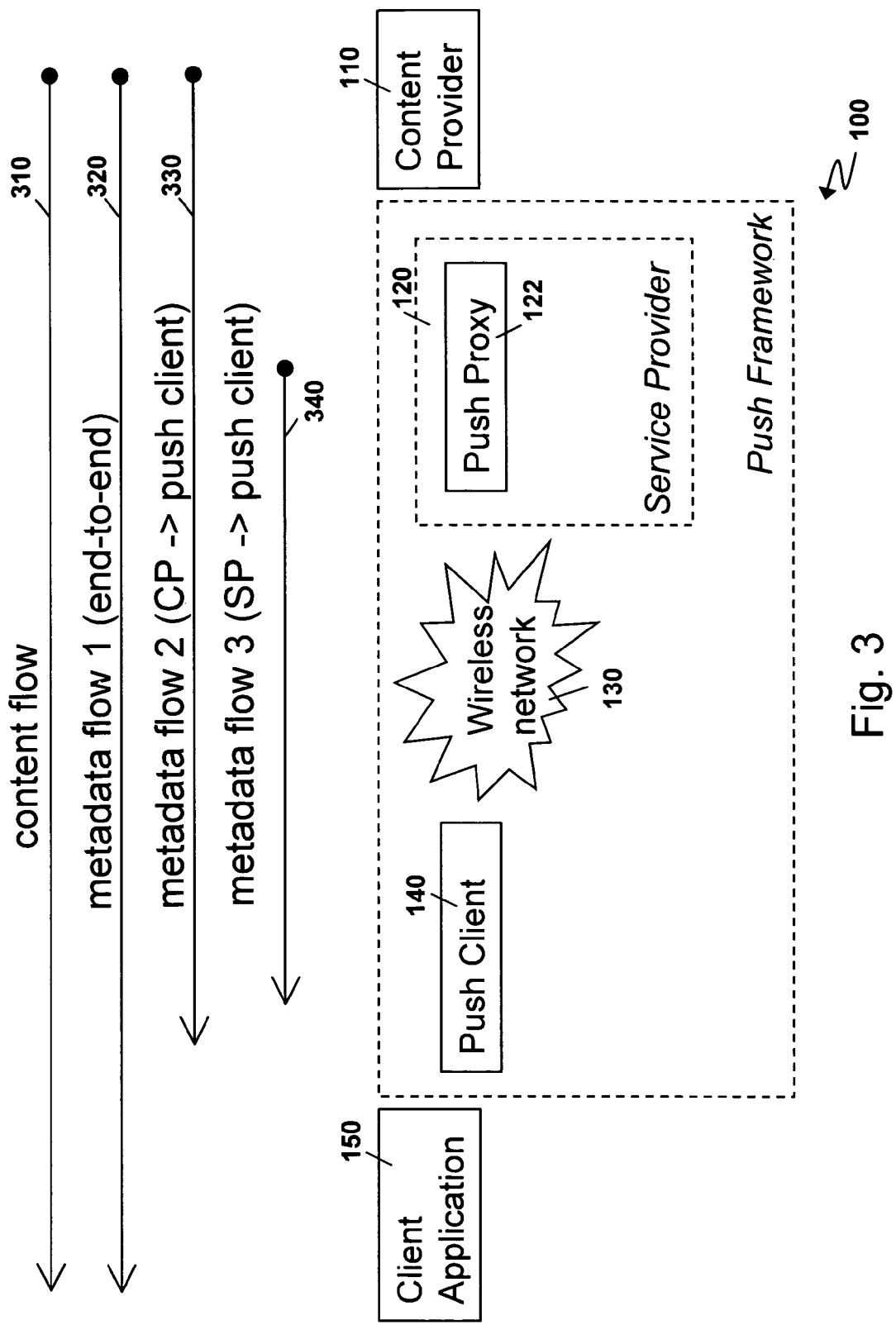
FIG. 3 is the block diagram of FIG. 1 showing content and metadata flow.

Reference is now made to FIG. 3. In order to add intelligence to a system, content is associated with a metadata. Metadata, in this case, is defined as data that can be used by a processing element to manipulate the content. As will be appreciated, a generic push system requires metadata to allow various content providers and applications to exist within the system. The metadata can be in various forms, including processing parameters or rules, or a processing handler, code or reference provided directly or a link to a processing handler, code or rules in another location, As can be seen in FIG. 3, content passes from content provider 110 to client application 150 and is illustrated by arrow 310. Metadata, which provides instructions to various components within the architecture 100 can also pass between components within architecture 100, usually along with the content. For example, arrow 320 illustrates metadata that originates at the content provider and is transparent to the delivery system until it reaches a client application 150.

Arrow 330 shows metadata created by content provided 110 that is intended for the push client 140, and thus only flows to generic push client 140.

Arrow 340 illustrates metadata generated by service provider 120 and intended for the push client 140, and thus is first associated with the content at the push proxy 122 and stripped from the content at generic push client 140. Examples of where this could occur include agreements between a user and a service provider regarding a billing plan and the level of service to be provided, where the service provider can use the metadata to limit the services available or provide enhanced services.

The flow of metadata and the role of metadata is described in more detail below.

Figure 4:
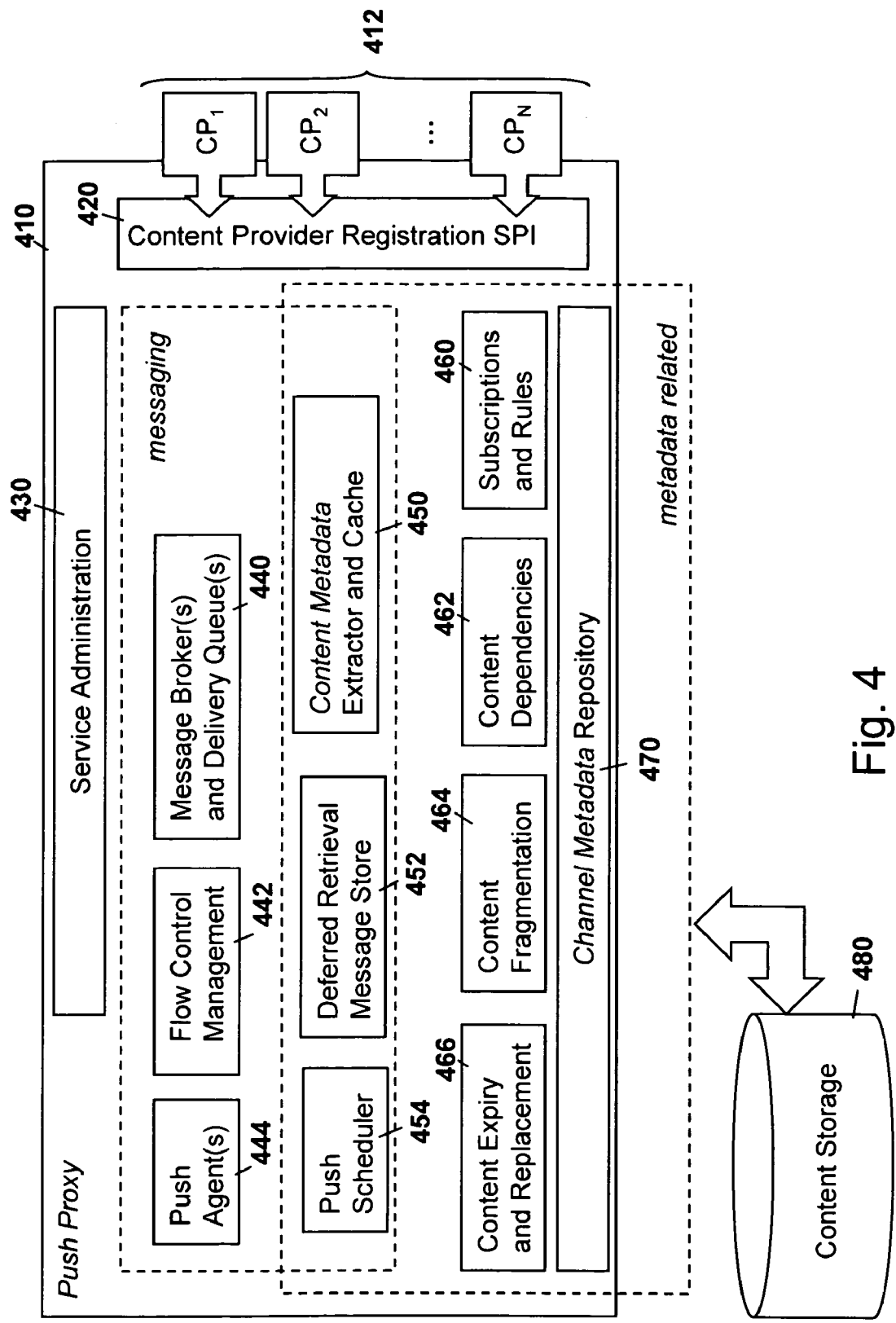
FIG. 4 is a block diagram showing a push proxy that can be used in association with the present system and method.

Reference is now made to FIG. 4. FIG. 4 illustrates a detailed exemplary push proxy 410 which can be used in association with the present system and method. As will be appreciated by those skilled in the art, push proxy 410 could be the same as push proxy 122 from FIGS. 1 and 2.

Push proxy 410 of FIG. 4 includes various elements that enable push proxy 410 to operate in a generic push environment. This facilitates flexibility since the push proxy is not limited to interaction with specific content providers or push clients, but instead can be adapted to a dynamic environment. The elements described below for push proxy 410 are preferable have within push proxy 410, but the elements are not exhaustive, and other elements are possible. Further, certain elements may be omitted from push proxy 410, with the remaining elements still able to perform generic push services.

Push proxy 410 includes content providers 412 registered to it. Content providers 412 register with a content provider registration service provider interface (SPI) 420. As is described in more detail below, it is desirable in this registration that the content provider 412 includes certain information for the channel being established, referred to herein as channel metadata. Content providers 412 can be the same as content providers 110 of FIG. 1.

Push proxy 410 further includes a service administration block 430 to administer the push proxy service.

Push proxy 410 includes various modules to deal with both the content and the metadata associated with that content. A first module is the message broker and delivery queue 440, which is a subsystem that consumes messages from content provider 412 and manages the content delivery queue. As will be appreciated by those skilled in the art, not all content for all client applications can be delivered at once and a delivery queue needs to be established in order to deliver the content in due course. For example, a device may be out of coverage and content may need to be stored.

Push proxy 410 further includes a flow control management block 442. Flow control management block 442 allows for the control of content flow. For example, a mobile station with limited space may only be able to receive a certain amount of information. In this case, the mobile device, through a push client 140 as illustrated in FIG. 1, may ask push proxy 410 to stop the flow of data to push client 140. The flow control management block 442 deals with this.

Alternatively, the mobile device can be off-line. Flow control management block 442 stops and starts the flow of data to push client 140 when content cannot be delivered as received by push proxy 410.

A further component of push proxy 410 is push agents 444. Push agents 444 are responsible for sending data to clients.

As will be appreciated by those skilled in the art, blocks 440, 442 and 444 deal with messaging only, and are not metadata related. In other words, the blocks handle the content of the messages, but not any metadata associated with the content.

A further component of push proxy 410 is the content metadata extractor and cache block 450. Content metadata extractor and cache block 450 operate on enveloped content metadata. Specifically, in the envelope model of metadata system, which is described in more detail below, each logical component within the system can have metadata associated with content processing. This metadata allows the logical component to perform actions on the content. Each logical component thus needs to be able to extract the metadata that is associated with it.

Content metadata extractor and cache block 450 is responsible for extracting metadata that is associated with push proxy 410 and for caching this metadata. The caching function allows optimization by eliminating the need to pass identical metadata in subsequent content envelopes from the same content provider. The extraction and caching of metadata are described below.

Deferred retrieval message store block 452 is used when it is not efficient to deliver content, or parts of it, to a client application. The deferred retrieval message store block 452 can be used to store content that is not delivered to the client until it is efficient to send the content, or until the content is pulled by the client. The deferred retrieval message store could also be used to cache auxiliary content that could be optionally send to or pulled by the client depending on client application navigation through already delivered content.

The purpose of deferred retrieval message store block 452 is better explained below with reference to FIGS. 19 and 21. By way of example, deferred retrieval message store block 452 may be used is the case where a user has requested location information, such as a restaurant close to the location of the user. The content provider or the service provider may have a model of providing information where advertisers can pay to add their information to search requests. Thus, the user that's requesting restaurant information for a location may also have information about stores, golf courses, gyms or other services close to their location attended to their request. A content provider bundles the restaurant information requested with the additional information and passes it to push proxy 410.

Push proxy 410 can, based on the metadata provided, create a content package to send to the client. The content package could include the information requested by the client, as well as a digest or summary of related information that the user may be interested in. The summary is sent to the user, but the deferred retrieval message store block 452 stores the actual data that was received from content provider 110. Thus, if in the future the user wishes to obtain more detailed information about information within the digest, this information is already stored at push proxy 410.

An alternative use for deferred retrieval message store block 452 is in the case where a user cannot accept the entire content at once. For example, if it is not feasible or economical to send all content to device, part of the content can be stored until a later time, when it can be pulled by the client or pushed when predefined rules are met. These rules can be specified by the network or service conditions by certain network or service conditions being satisfied. This is described in more detail with reference to FIG. 19 below.

Push scheduler 454 schedules delivery slots for clients. As described above, in some situations it may not be efficient to push all of the content at once. Push scheduler 452 can determine that it will push some information immediately and the rest according to a predefined schedule. Also, push scheduler 454 may use nature of the content to determine when the content should be pushed. Specifically, metadata may indicate that some content is a high priority or has an expiry that is limited in time, and this content may be pushed immediately, whereas content that has been indicated to have a low priority or with no expiry may be pushed later when conditions for passing data are more favorable.

As will be appreciated by those skilled in the art, blocks 450, 452 and 454 deal with both the content of the message and the metadata that is associated with the message.

Subscription and rules block 460 tracks applications that are registered to receive a service and monitors rules on how to handle particular content being delivered. Content is typically delivered based on a subscription by the client or on behalf of the client. The user, for example if they want a particular service, can actively request subscriptions. Subscriptions can be made on behalf of a user, for example, if the user has signed an agreement with their service provider 120 to receive a benefit for a service. This could include the case where a user receives a preferred rate as long as the user agrees to receive a certain number of advertisements each day. In this case, the service provider 120 may make the subscription to the advertisement provider on behalf of the client.

When an application is deleted on a mobile device or when the application unregisters from a subscription, subscription and rules block 460 can unsubscribe that user.

Content dependencies block 462 is used by push proxy 410 to advertise services that a mobile device user can utilize. Thus, if a mobile device user does not have a screen or bandwidth or memory sufficient for the service, content dependencies block 462 could block the advertisement of that service to the user.

Content fragmentation block 464 is used to fragment content. This could be used, for example, if the mobile device is unable to receive all of the content at once. Content fragmentation block 464 is used to break the content into various components. It can be used in association with deferred retrieval and message store 452 to store fragmented content that has not yet been delivered.

Content expiry and replacement block 466 is used for two purposes. First, this block can be used to monitor subscriptions. Each subscription has an expiry time and when this expiry time is met, the subscription can be ended.

Also, content expiry and replacement block 466 can be used to monitor information. Certain content will have time limits on the validity of the information. For example, a traffic application used to monitor rush hour traffic will be very time dependent. If, for some reason, push proxy 410 is unable to deliver the content immediately to a mobile device, this content is stored in content storage 480 for future delivery. However, if the content is not delivered within a certain specified time period, then it could expire and not be delivered at all.

Similarly, content replacement deals with a situation where the information is being updated. For example, a client application that is receiving stock quotes may only want the latest stock quote. Thus, if the push proxy 410 is unable to deliver the stock quote to push client 140 and a subsequent stock quote is received from a content provider 110, metadata within the subsequent stock quote can indicate that it should be used to replace the previous stock quote. Replacement of stored information rather than adding all information to a delivery queue frees space within content storage 480.

Channel metadata repository 470 is used to store channel metadata, which is described in more detail below.

The above describes an exemplary push proxy 410 that can be used with the method and systems herein. The blocks and elements of push proxy 410 allow push proxy 410 to be used in a generic dynamic content delivery system where the type of content and handling of the content at an application can vary and is not predetermined.

Figure 5:
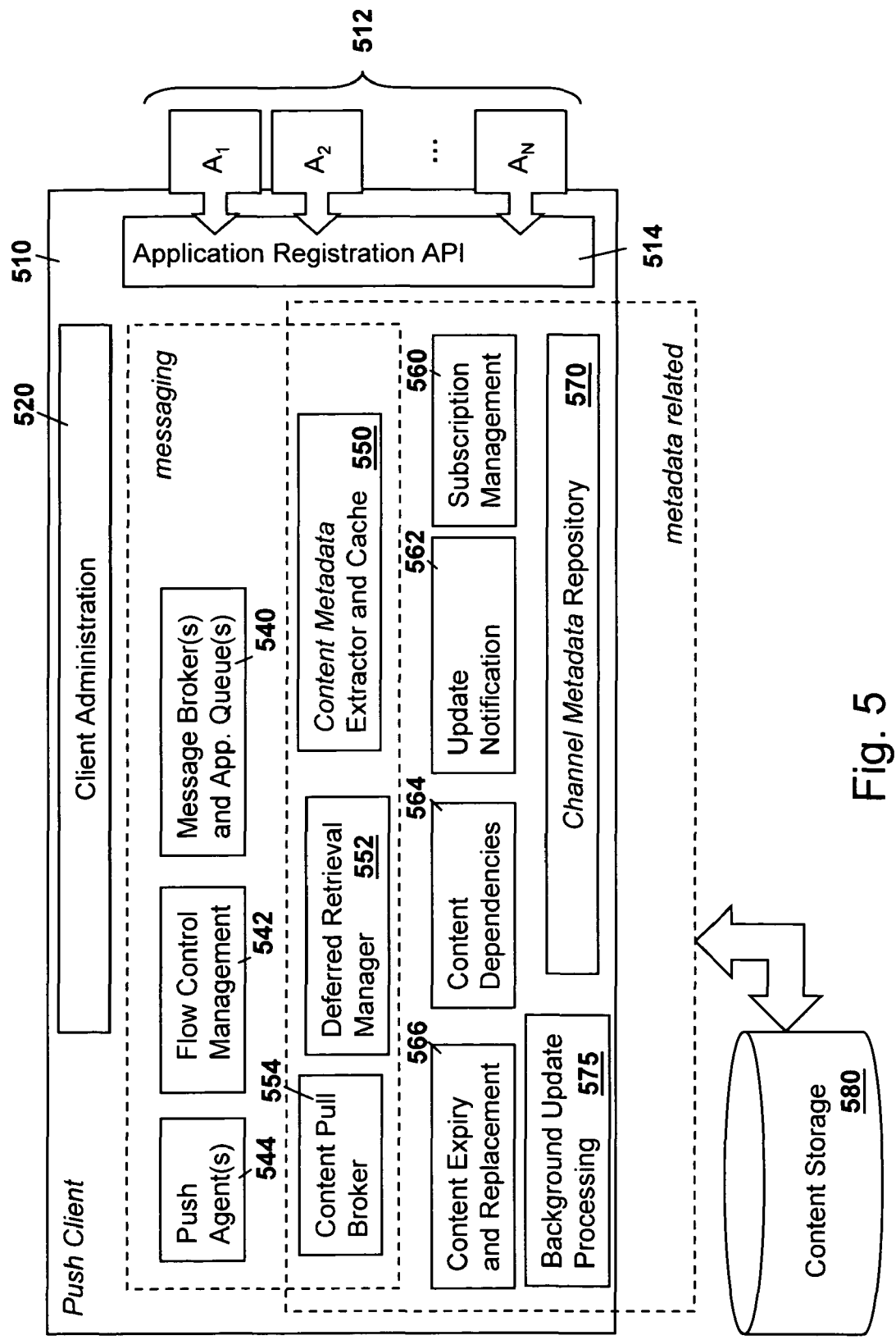
FIG. 5 is a block diagram showing a push client that can be used in association with the present system and method.

Reference is now made to FIG. 5. FIG. 5 illustrates a push client 510 that can be used in association with the system and methods herein. Push client 510 can be the same as push client 140 from FIGS. 1 and 2.

As will be appreciated by those skilled in the art, a push client 510 that is to be used in a generic system in which the content and processing of the content is not predetermined should include blocks or modules that can be used to accommodate both the content and the metadata associated with the content. The blocks defined with regard to FIG. 5 are not meant to be exhaustive, and other blocks could also exist within a push client 510. Further, the blocks within push client 510 can, in some instances, be omitted without restricting the functionality of the other blocks within push client 510.

A push client 510 services applications, and one or more applications 512 can register with push client 510. The application registration uses an application provider interface 514 as the interface for registration and application provider interface 514 can further be used to extract channel metadata for the application, as described in more detail below.

Push client 510 includes client administration 520 used to administer the push client 510.

As with push server 410 of FIG. 4, push client 510 includes various blocks that deal with messaging, various blocks that deal with metadata, and various blocks that deal with both messaging and metadata.

Message broker and application queues 540 handle messages from push proxy 410 for delivery to applications 512. An application queue is a queue of messages for applications 512.

Flow control management block 542 is used to notify push proxy 410 of FIG. 4 to stop pushing content or to resume pushing content. This can be used, for example, when the push client 510 has a limited amount of memory that it can accept pushed content. In this case, before the push content is consumed push client 510 needs to stop the flow of content from push proxy 410. Once the content has been consumed, flow control management block 542 can be used to start the flow of data again.

Push agents 544 within push client 510 are used to receive information from push proxy 410 of FIG. 4.

As will be appreciated by those skilled in the art, message brokers and application queues 540, flow control management block 542, and push agents 544 deal exclusively with messaging and not with metadata.

Content metadata extractor and cache block 550 is used to extract dynamic metadata destined for push client 510. As indicated above with reference to push proxy 410 of FIG. 4, any of the processing elements in the dynamic content delivery architecture could have metadata destined for them and this metadata needs to be extracted. Thus metadata destined for push client 510 is extracted by content metadata extractor and cache block 550.

Further, the content metadata extractor and cache block 550 is preferably adapted to cache metadata. Metadata for push client 510 that does not change between a first content package and a second content package does not need to be passed, saving processing time at push client 510 by not requiring the extraction of this metadata, and further saving network resources by not requiring metadata for push client 510 to be passed over wireless network 130.

Deferred retrieval manager 552 is used for analyzing fragments of content that are received and putting the content together in the correct way. As described in more detail below, data can be either linear or non-linear. If the data is non-linear, then metadata is required in order to reconstitute it, and this is done by deferred retrieval manager 552. The deferred retrieval manager 552 also is adapted to analyse a digest of information available in the deferred retrieval store 452 of push proxy 510 and drives the content pull broker 554 (described below) to retrieve this information when required by user. This includes predictive retrieval when content navigation enters a certain branch of the content structure graph or when bandwidth or cost conditions are satisfied Content pull broker 554 is used in a push/pull model where the push client 510 is also able to pull content in certain situations. Such situations are described below in more detail with reference to FIG. 19.

As will be appreciated by those skilled in the art, content metadata extractor and cache 550, deferred retrieval manager 552 and content pull broker 554 deal both with messaging content and with metadata.

Subscription management block 560 is the same as subscription and rules block 460 of FIG. 4. Specifically, subscription management block 560 is used to manage subscriptions. If an application de-registers or is deleted from a mobile device then subscription management block 560 ends the subscription. The subscription management block 560 can also re-subscribe on behalf of a client application when subscription channel expires.

Update notification block 562 works with client applications and is used to notify the applications that new content is waiting for them. This can be done in one of three ways:

a. A first way that update notification block 562 can notify an application 512 is for push client 510 to send the content to application 512 directly.

b. A second way that update notification block 562 can notify applications 512 of new content is to store the content in content storage 580 and to optionally notify applications 512 that content is waiting. Notification in this case is optional. Specifically, if an application 512 knows that information destined for it is stored within a specific memory block, one option for the application discovering that is has new data is to periodically poll the memory location to see whether there has been something written to it. Alternatively update notification block 562 can send a message to application 512 indicating that it has new data an possibly the location that the data is stored.

c. A third way that update notification 562 can notify applications 512 of new content is to store the content internally and notify the application. The application can then call on the push client to retrieve the content.

Content dependency block 564 is the same as content dependency block 462 of FIG. 4, and can determine whether to advertise the service to the mobile device.

Content expiry and replacement block 566 is the same as content replacement and expiry block 466 of FIG. 4. The expiry of content and replacement of content can thus be handled at push client 510 in addition to the push server or push proxy.

Channel metadata repository 570 is used to store channel metadata for application 512.

Background update processing module 575 is used for performing updates when an application 512 is unavailable. The background update allows, for example, the replacement of data with newer data inside the application storage. Thereafter, when a user starts the application, the data displayed by the application is correct and updated.

Background update processing module 575 uses processing rules translate content into a format acceptable for an application. It can execute and process content in content store 580.

By way of example, a task list that is updated for a contractor overnight could have tasks pushed to it. The task application is not started during this time, and background update processing module 575 can be used to update the content for the task application. This could be done with code for handling an extensible mark-up language (XML) file, and could exist on the device in a file called "handler.exe". Background update processing block 575 on push client 510 can run handler.exe, passing the XML document has a parameter. The handler then constructs the task into the application's internal format.

Once the background update processing block 575 of push client 510 constructs the task into the application internal format, it then can read the task into the task list from content storage 580 and append the new task to the list. It then can store the modified back to content storage 580 for when the task application next connects to push client 510.

FIG. 5 therefore illustrates a push client 510 that can be used in a generic dynamic content delivery system, where content and processing of the content is dynamic and not predetermined. The blocks described above with reference to the push client 510 of FIG. 5 are used to accommodate the dynamic nature of the system.

As indicated above with reference to FIG. 3, content is associated with metadata to provide intelligence for the processing of the content. In accordance with the present method and system, metadata can be divided into two types of metadata. Specifically, static (channel) metadata and dynamic (content) metadata.

Due to the unlimited possibilities of types of content providers and applications, metadata is critical in order to build generic systems. The only way to handle the specific type of content is through metadata.

Static metadata is metadata that provides rules on how to process specific types of content. Static metadata can be broken into various levels of abstraction and include for example structural information about the content itself. For example, a Real-time Simple Syndication (RSS) document could be delivered with an RSS 2.0.XSD structure, and all content from that content provider will be delivered with this structure.

A further level of abstraction for static metadata includes the provision of processing rules for content subtype. This could be application specific. Thus, for example, a financial news application indicates that data should be extracted from a financial news RSS stream, stored in a predefined location, and that the application should be notified about the arrival of the information. The application always requires content destined for it to be handled in this way.

The static metadata (also referred to herein as channel metadata) stays the same throughout the subscription between the application and the content provider, and thus the static metadata can be established once for each element within the architecture and for each content delivery channel. In one embodiment this is done at the time of registration of the application or the content provider.

Dynamic metadata is metadata that is associated with a particular piece of content. For example, expiry information associated with a particular piece of data or replacement rules and information associated with a particular piece of data (i.e. document K replaces document L).

As indicated above with reference to FIGS. 4 and 5, each processing entity can receive both static and dynamic metadata that is directed at that processing entity. Thus push proxy 410 uses the content metadata extractor and cache 450 to extract the dynamic metadata, and content expiry and replacement modular 466 is used to replace undelivered content with newer content received at push proxy 410.

Figure 6:
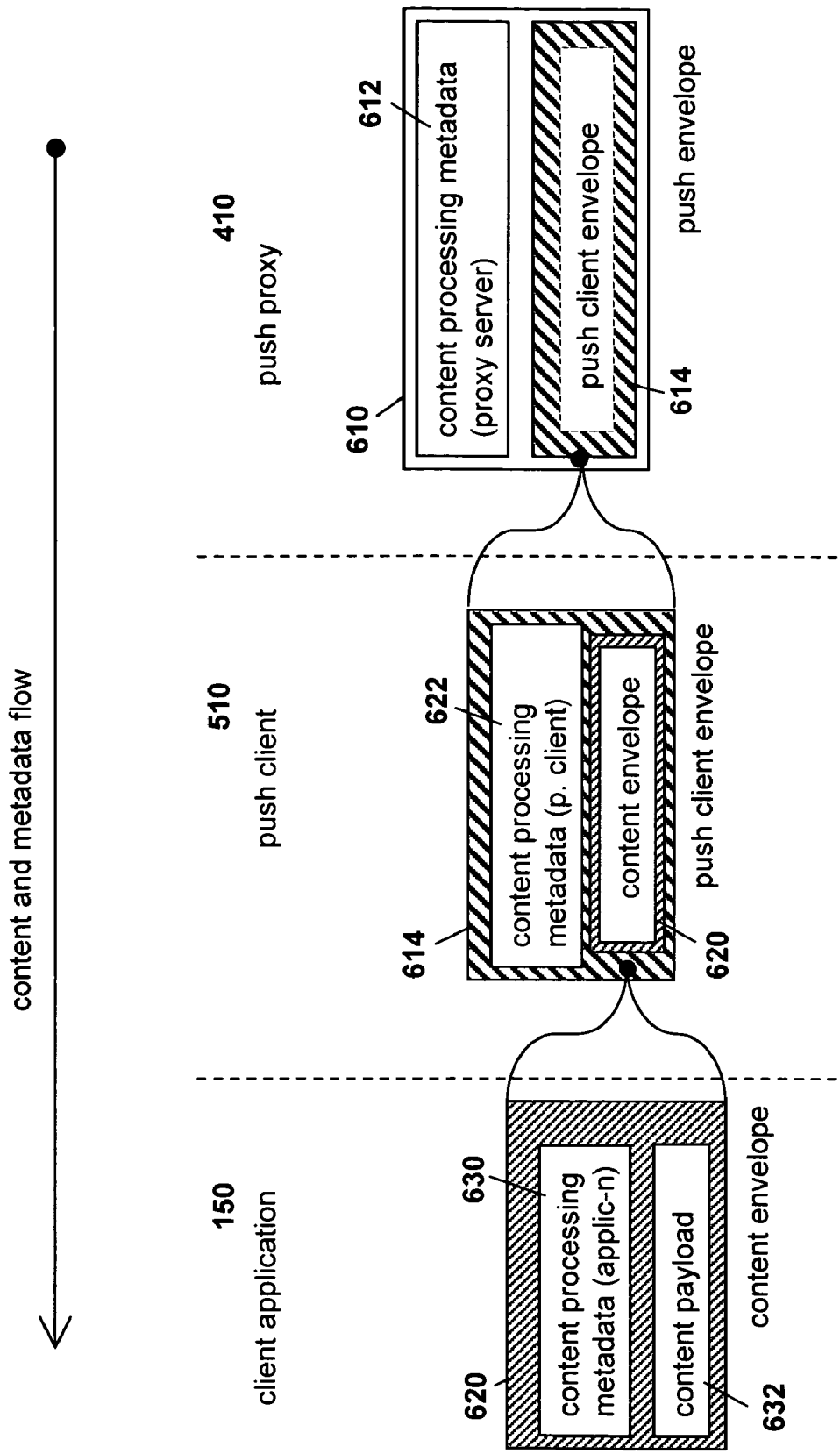
FIG. 6 is a block diagram showing a multilayer envelope model of content and metadata.

Reference is now made to FIG. 6. FIG. 6 illustrates a multilayer envelope model for content metadata.

A push proxy 410 receives a push envelope 610 that includes content processing metadata for the proxy server 612 and a push client envelope 614. The push proxy 410 extracts content processing metadata 612 and uses this metadata to process push client envelope 614. Metadata 612 dictates to push proxy what to do with the push client envelope 614.

Push client envelope 614 is passed to push client 510 where it is broken into a content envelope 620 and a content processing metadata 622. Content processing metadata 622 is used by push client 510 to process the content envelope 620. For example, this can be used to instruct push client 510 to perform replacement of previously delivered content envelope 620 with the latest envelope if client application 150 is only interested in the latest version of the content.

Content envelope 620 is passed to client application 150. Content envelope 620 includes content processing metadata 630 for the application and the content payload 632 that is to be consumed by client application 150.

As will be appreciated by those skilled in the art, the nesting of envelopes in accordance with FIG. 6 provides for a rich dynamic environment in which processing can occur at any processing element of the architecture and which the content provider 110 can specify how specific content is to be dealt with. In one embodiment, metadata directed to a particular logical element is opaque to other processing elements.

Alternatively, the service provider 120 can also add metadata at push proxy 410 for processing at push client 510 or client application 150.

Figure 7:
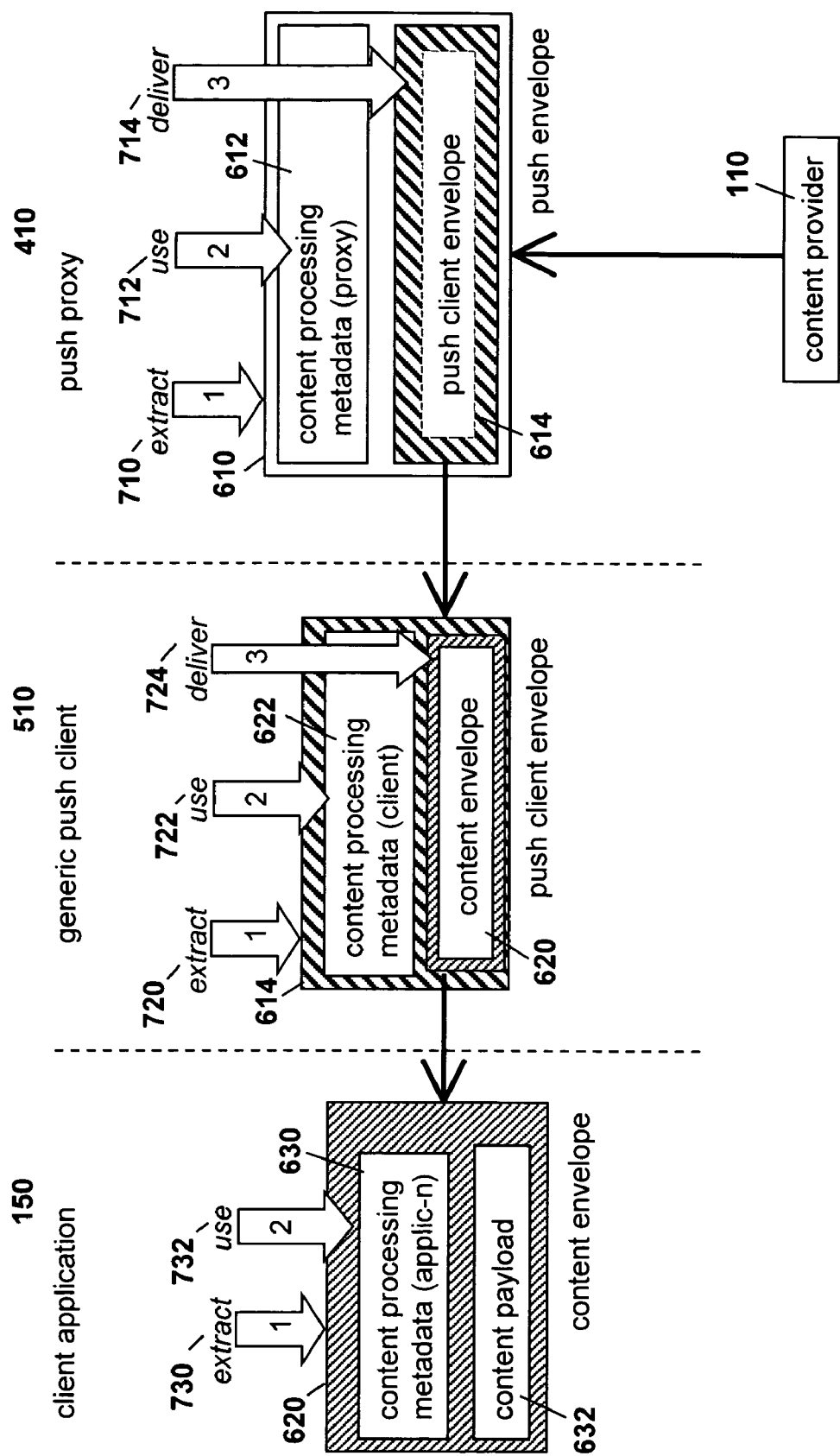
FIG. 7 is the block diagram of FIG. 6, showing processing steps dynamic metadata for each envelope.

Referring to FIG. 7, this figure shows the envelope model of FIG. 6 and the steps that each processing element takes with an envelope. As illustrated in FIG. 7, push proxy 410 first extracts the metadata from push envelope 610. This is done in step 710.

In step 712, push proxy 410 uses the metadata to process the push client envelope 614. In step 714, push proxy 410 delivers the push client envelope 614 to push client 510.

Similarly, push client 510, in step 720 extracts the content processing metadata 622 from push client envelope 614. In step 722, push client 510 uses the content processing metadata 622 on content envelope 620. In step 724, the push client 510 delivers content envelope 620 to client application 150.

In step 730, client application 150 extracts the content processing metadata 630 and in step 732 uses the content processing metadata 630 on content payload 632.

Figure 8:
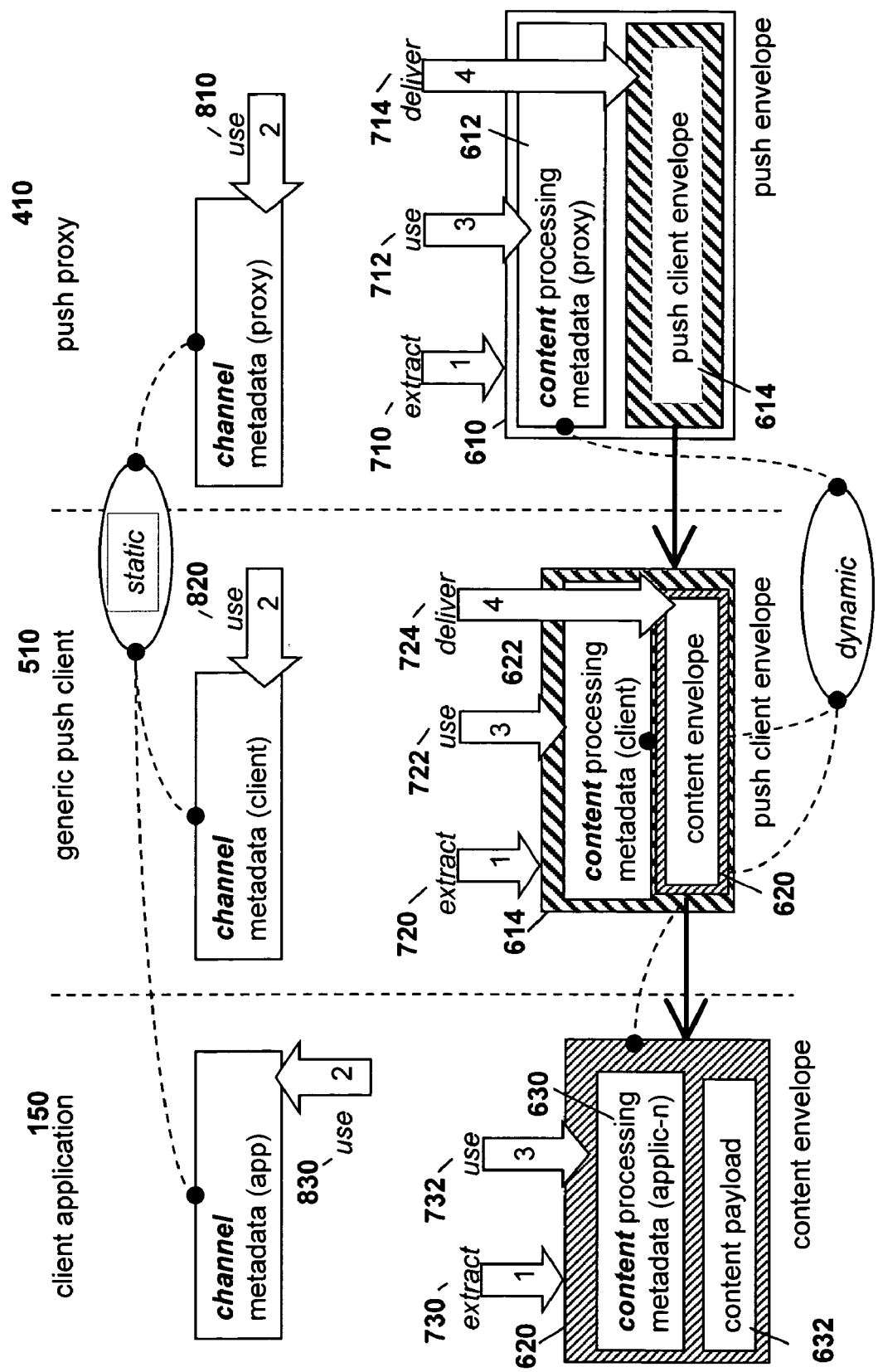
FIG. 8 is the block diagram of FIG. 6, additionally showing processing using static and dynamic metadata.

Referring to FIG. 8, this figure shows the method as illustrated in FIG. 7 with the additional step of the use of static or channel metadata. Specifically, after the metadata has been extracted in step 710 from push envelope 610, the push proxy 410 next uses the static channel metadata to process the push client envelope in step 810. In step 712, push proxy 410 next processes the content processing dynamic metadata 612. Push proxy 410 next delivers the push client envelope 614 in step 714.

Similarly, push client 510 extracts the content processing metadata 622 in step 720. Push client 510 then uses the channel metadata in step 820 on the content within content envelope 620. Push client 510 then, in step 722, uses the dynamic content metadata in content processing metatadata 622 prior to delivering content envelope 620 to client application 150 in step 724.

Client application 150 first extracts, in step 730, content processing metadata 630. It then uses the channel metadata in step 830 on content payload 632. Client application 150 then uses, in step 732, content processing metadata 630 on content payload 632.

As will be appreciated by those skilled in the art, the above model therefore allows for both static metadata to be applied for the channel along with dynamic metadata that is associated with the particular content being sent.

Figure 9:
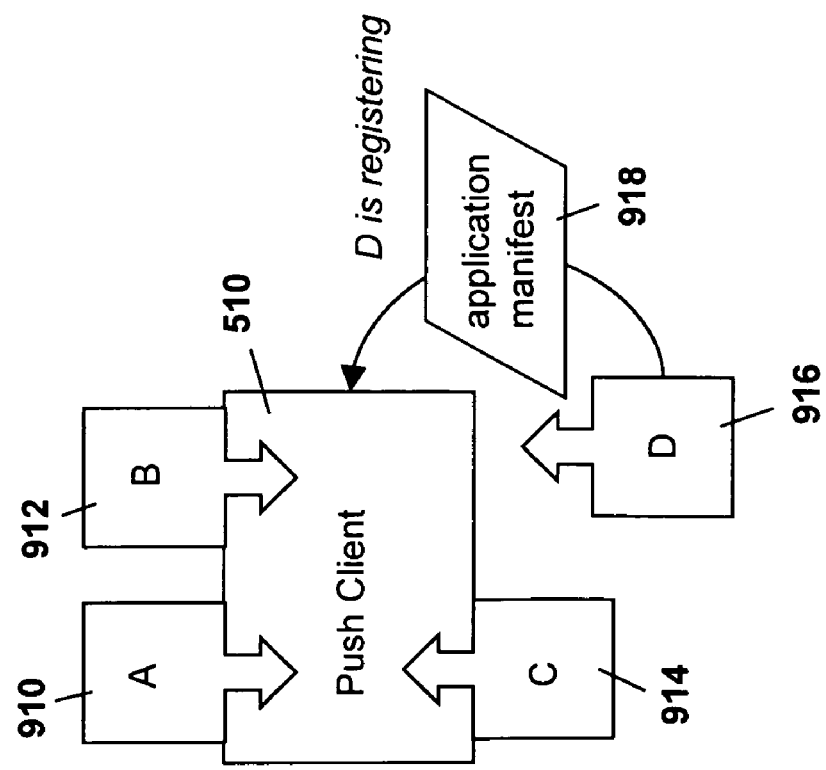
FIG. 9 is a block diagram showing a registration process for an application to a single shared push client.

Reference is now made to FIG. 9. As will be appreciated from FIG. 5, push client 510 can serve multiple target applications 512 on a mobile device. An efficient runtime registration mechanism is required where applications can register with the dynamic content delivery framework without interrupting service for other applications.

Referring to FIG. 9, push client 510 includes three applications, specifically applications 910, 912 and 914 that are already registered with the push client. As will be appreciated, the plug in model is important because new devices can allow unlimited application types to be installed on the device. Further, applications can be installed dynamically, leading to a mobile device becoming an application platform. Because the device can be an application platform, it must be capable of dynamically incorporating new applications.

As seen in FIG. 9, application 916 wants to register with push client 510. Application 916 includes an application manifest 918 that, in a preferred embodiment, provides the channel metadata for the application. Specifically, application manifest 918 provides information to push client 510, and ultimately push proxy 410 and content provider 110 from FIG. 1 with the static metadata for the application. This can include, but is not limited to, what type of content the application expects, how the content will be delivered, whether the application needs notification, or other channel information that would be evident to those skilled in the art having regard to the present system and method.

Application 916 therefore registers with push client 510, providing application manifest 918 to establish a channel to a content provider for servicing application 916.

Figure 10:
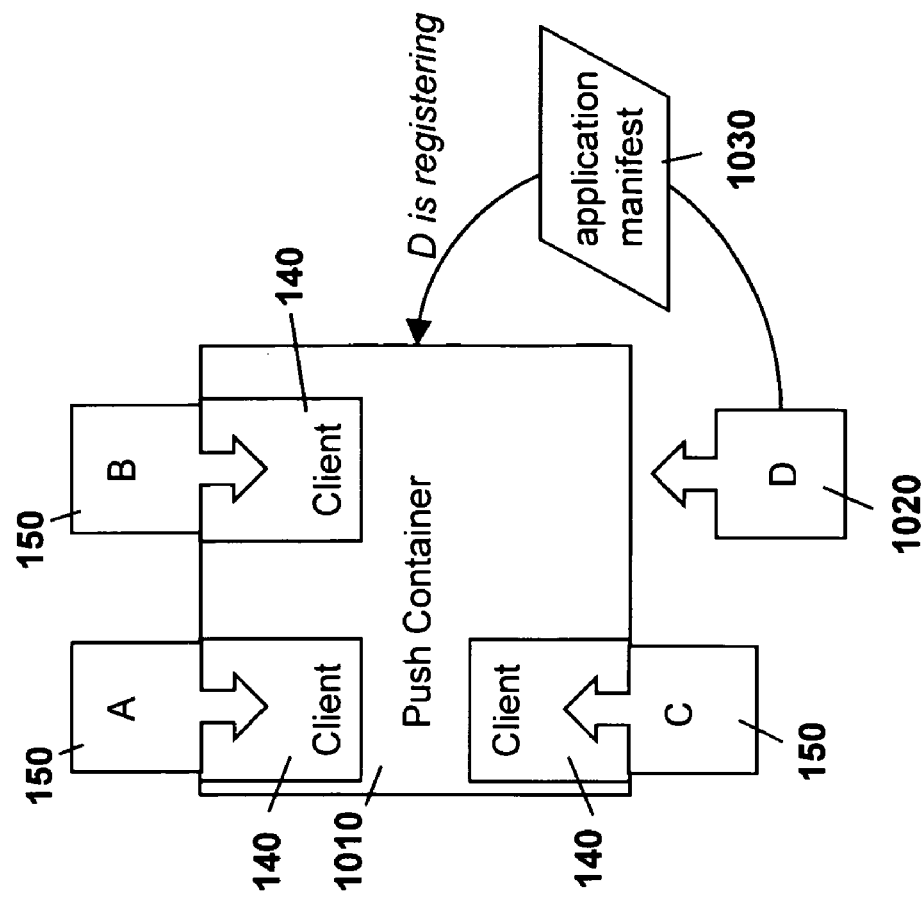
FIG. 10 is a block diagram showing a registration process of an application to a push container managing a pool of push clients.

Referring to FIG. 10, an alternate model could be the model described with regard to architecture 220 of FIG. 2. Specifically, in the model of FIG. 10, a client application 150 is paired with a push client 140. Each of the client application 150/push client 140 pairs are coordinated with a push container 1010.

When application 1020 wishes to register with push container 1010, a client 140 is created, or if it already exists is used, by push container 1010. Further, in registration, the application 1020 provides an application manifest 1030 to push container 1010, thereby providing channel metadata (static metadata) for application 1020.

Figure 11:
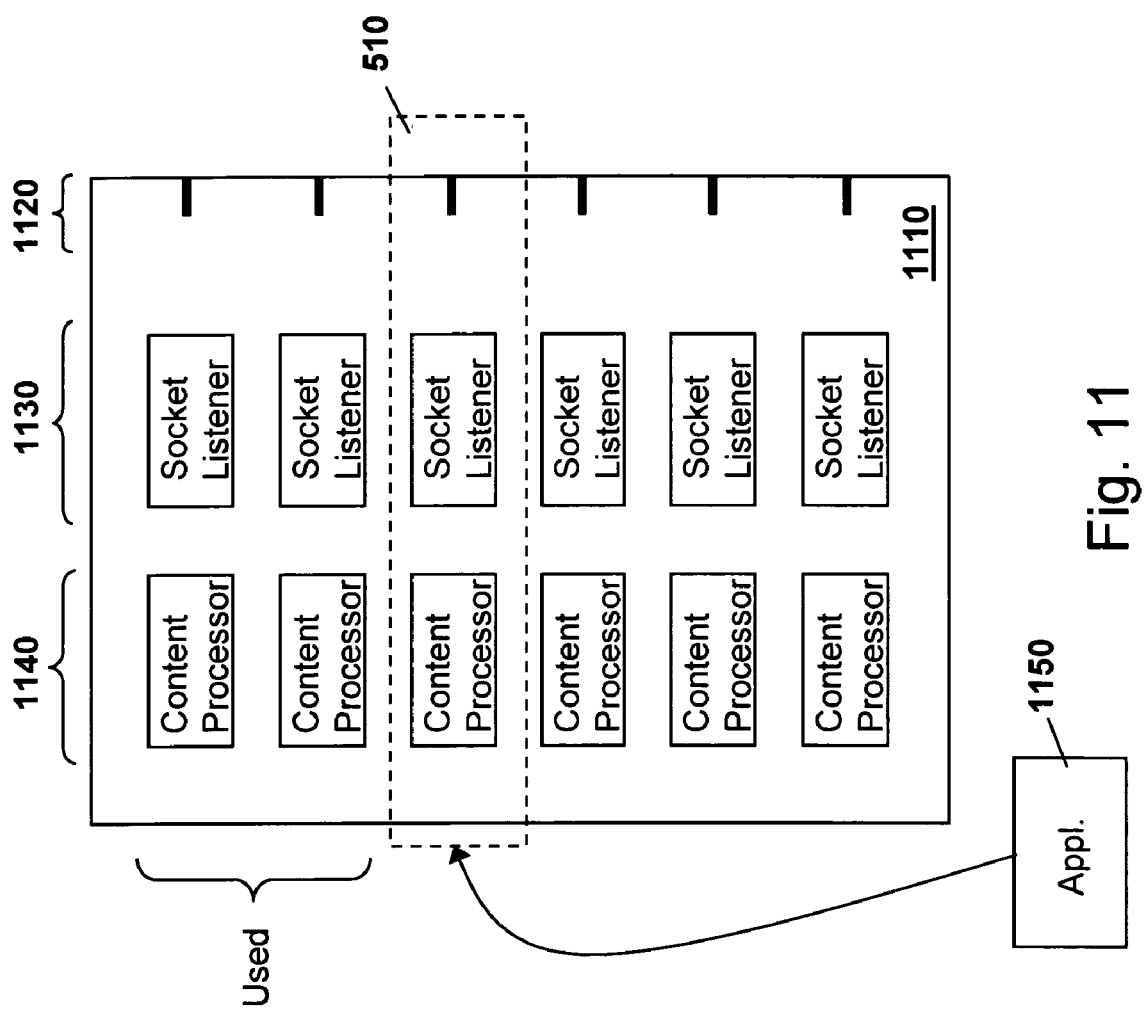
FIG. 11 is a block diagram showing an application registering to a content processor and socket listener.

An alternative illustration of FIG. 10 is shown in FIG. 11. Specifically, a push container 1110 manages/maintains a pool of push clients. When an application registers with the container it obtains a dedicated push client 510, which in the simple case could be represented by a pair of a socket listener 1130 and content handler. The push client is returned to the pool when the application unregisters from the container (and content delivery service) or is deleted from the device.

Push container 1110 includes sockets 1120 for communication. Further, push container 1110 includes socket listeners 1130 and content processors 1140 assigned to a particular socket.

As seen in FIG. 11, various content processor and socket listener pairs are used by previously registered applications 150.

When a new application 1150 wants to register with push container 1110, a new content processor and socket listener 1120 and 1130 are assigned to service application 1050.

The above therefore provides for a generic push framework in which a client application 150 that is new can be implemented and registered with a push client 510 or push container 1010 or 1110, thereby allowing the device to become an application platform capable of dynamically incorporating new applications. The passing of an application manifest 1030 or 918 from FIGS. 9 and 10 above allows for the establishment of channel metadata, thereby allowing the content to be processed according to the application's requirements.

Referring to FIG. 12, content providers 110 similarly need to register with a push proxy 410. As seen in FIG. 12, push proxy 410 includes three content providers, namely, 1210, 1212 and 1214, already registered with push proxy 410. Content provider 1216 desires to register with push proxy 410.

Similarly to the application manifest 918 illustrated in FIG. 9 provided by an application 916 when registering with push client 510, content provider 1216 includes a service manifest 1218 that is passed to push proxy 410 when content provider 1216 registers. Service manifest 1218 includes information concerning the type of information that the content provider will provide, how often it provides this information, the format of the information, and any other information that is useful for the service or for advertisement of the service. Other information is possible.

Push proxy 410 thus uses service manifest 1218 to establish channel (static) metadata for content provider 1216.

Referring to FIG. 13, an alternative embodiment, represented by architecture 230 of FIG. 2, is to have a push container with a number of push proxy 122 and content provider 110 pairings. As with FIG. 12, various applications could already be registered with push container 1310, and in the example of FIG. 12, applications 1312, 1314 and 1316 are already registered with push proxies 1313, 1315 and 1317 respectively.

A new application 1320 wants to register with push container 1310. Thus, push container 1310 creates a new proxy (not shown) or uses an existing proxy (not shown) with which it associates content provider 1320. Further, content provider 1320 provides service manifest 1322 to describe the content that content provider 1320 will be providing, thereby allowing the establishment of channel metadata.

As will be appreciated by those skilled in the art, the embodiments of FIGS. 9 and 10 show two options for push clients, either with shared applications or with dedicated push clients per application. One skilled in the art will realize that other embodiments are possible. Similarly, with respect to FIGS. 12 and 13, a push proxy with multiple content providers registered to it is shown or a dedicated push proxy for each content provider, and embodied in a push container is shown.

Figure 14:
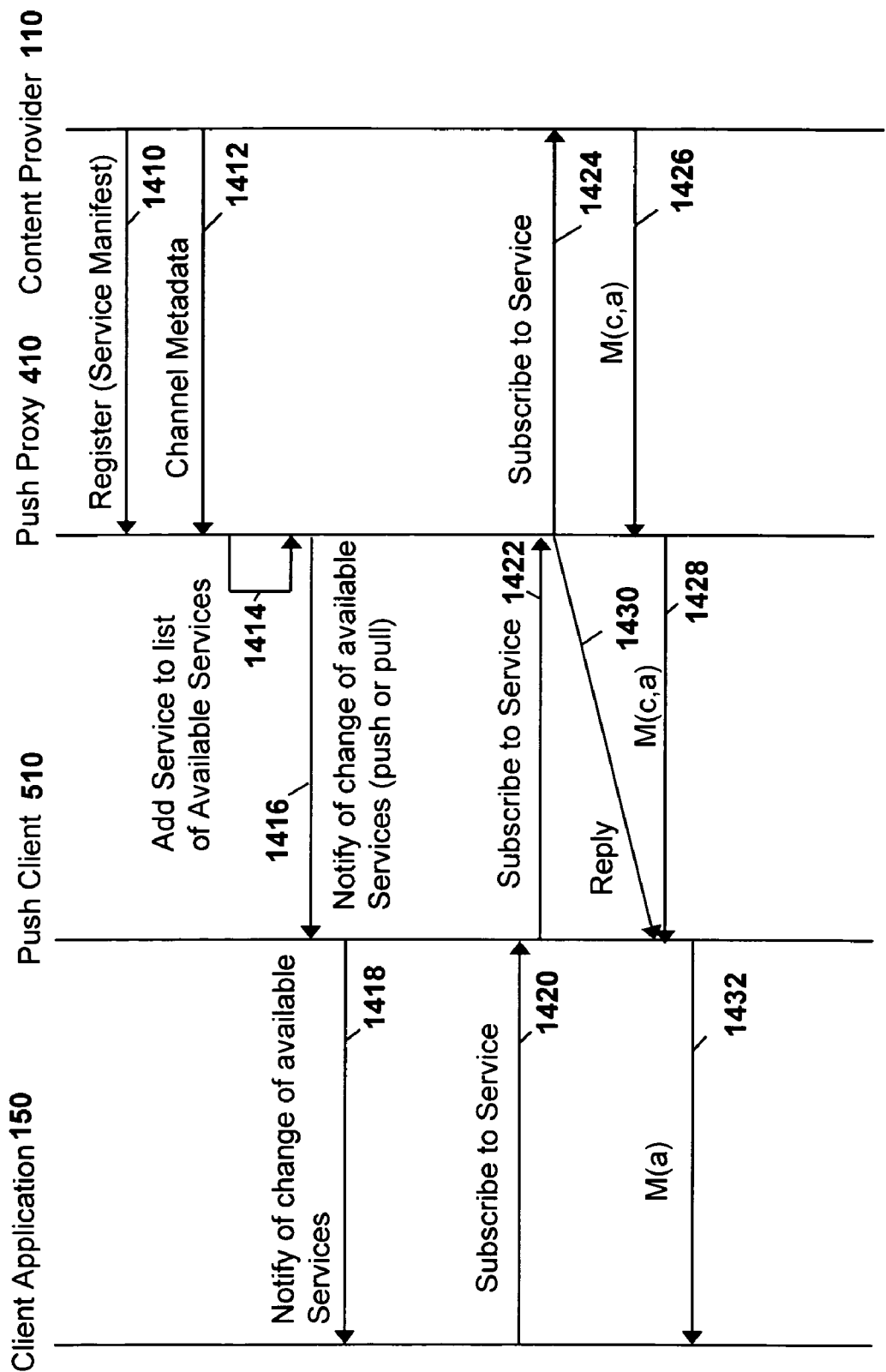
FIG. 14 is a flow diagram showing registration messages between a content provider and client application.

With reference to FIG. 14, messaging between a content provider 110 and a client application 150 is shown. Content provider 110 provides a registration message to push proxy 410. This message can include the service manifest which can be used to provide channel metadata to push proxy 410. This is done in step 1410.

Content provider 110 may also or alternatively provide channel metadata in a subsequent message, as illustrated by step 1412.

Push proxy 410 then adds a service to a list of available services (the service catalogue) in step 1414.

An optional step in the example of FIG. 14 is for push proxy 410 to notify push client 510 of the new service available in step 1416 and this notification may be propagated to a client application 110 in step 1418.

As will be appreciated by those skilled in the art, steps 1416 and 1418 are optional, and other alternatives include client application 150 pulling the service catalogue periodically from push proxy 410 to view new services.

When a user or service provider for client application 150 decides that client application 150 should subscribe to a service, it sends a subscription message in step 1420. The subscription message is further passed to push proxy 410 in step 1422.

Once push proxy 410 receives the subscription message in step 1422, two options are available. A first option is to send a message 1424 to content provider 110 for a subscription and then receive a message envelope that includes metadata back in step 1426. The metadata could be device or device type specific.

Alternatively, push proxy 410 may receive the subscription message in step 1422 and immediately, based on information already provided by content provider 110 and stored on push proxy 410 reply in step 1430 to push client 510. This reply is propagated to the client application 150 in step 1532. As will be appreciated, the reply can include channel metadata specific for content provider 110.

The difference in models can be dependent on who is customizing the data for the application. As will be appreciated, content provider 110 provides the best customization of content compared with other processing elements. However, service provider 120, through push proxy 410, can also provide for customization of content.

Further, as will be appreciated, the structure of the content could be dependent on the data that the application requires. For example, in a financial application, the application may want both stock quotes and currency rates. The following XML may be used:

```
<FIN>
    <quotes>
        <quote ticker = ABC>
            18.54
        </quote>
        <quote ticker = XYZ>
            123.45
        </quote>
    </quotes>
    <rates>
        <rate id = "US-CAN">
            1.15
        </rate>
        <rate id = "US-EURO">
            0.85
        </rate>
    </rates>
</FIN>
```

If the user only wanted quotes and no currency exchange, the structure could change to:

```
<FIN>
    <quote ticker = ABC>
        18.54
    </quote>
    <quote ticker = XYZ>
        123.45
    </quote>
</FIN>
```

The metadata can provide information to the application on the structure that of the data being passed.

Thus, two models exist. Static metadata can be provided to push proxy 410 and to push client 510 either during registration or afterwards. Alternatively, the metadata for push proxy 410 and push client 510 can be pre-provisioned, i.e. information is stored at a push client or a push proxy until an application registers with a client.

Figure 15:
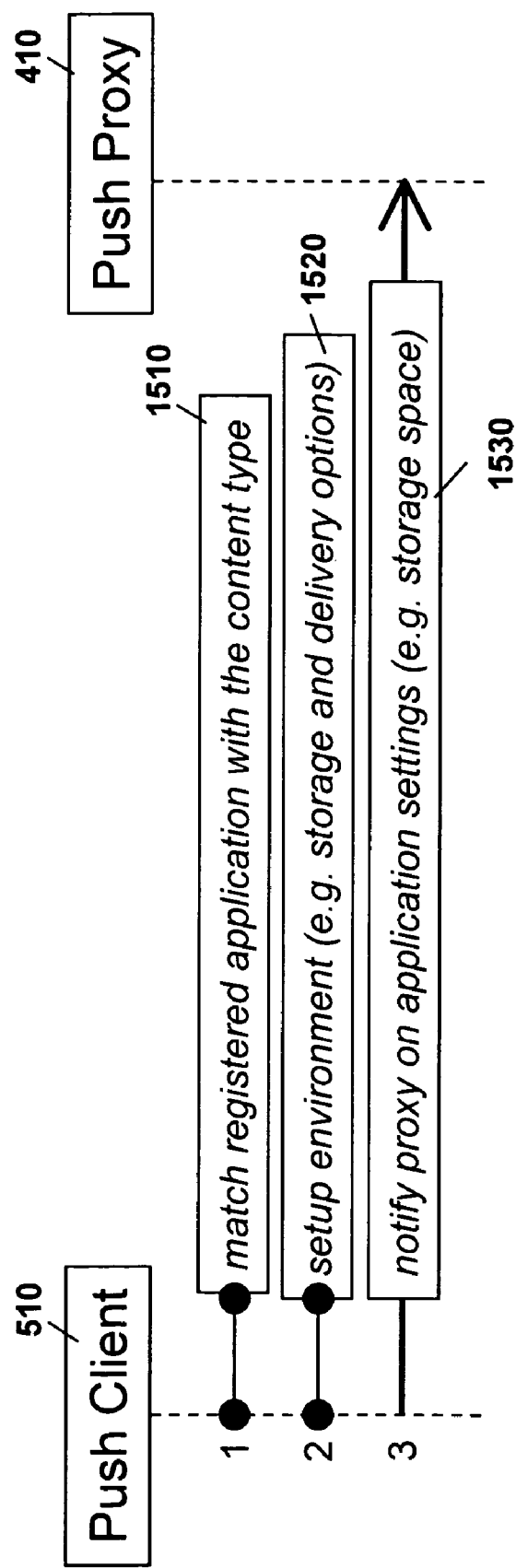
FIG. 15 is a block diagram showing interaction during registration between a push client and push proxy.

Reference is now made to FIG. 15. FIG. 15 shows logical steps that occur upon registration of an application with a push client 510.

Once an application registers with push client 510, a first step 1510 is to match the registered application with the content type required by the application. This is known from the application manifest 918 as illustrated in FIG. 9.

A second step 1520 is to set up the environment for the application. These include but are not limited to storage and delivery options for the application. For example, an application may limit transmissions to a predetermined amount of data. The push client 510 in a flow control event, or if the application or client is out of touch, may require the caching of the data for the application and optionally to notify the application that data is waiting.

A third step 1530, is to notify push proxy 410 of the application settings. This includes for example available storage for the application or push client 510. As will be appreciated, push proxy 410 should not push more data than push client 510 can store. Thus, the application settings could include an upper limit of the data that is passed. Referring to FIGS. 4 and 5, this could invoke content fragmentation block 464 to fragment the content if it is greater than the application can process. Also, if the data is non-linear, content dependencies block 462 may be required to create metadata for content dependencies block 564 of FIG. 5 in order to allow content dependencies block 564 to reconstitute the data.

Referring again to FIG. 15, step 1530 can also indicate preference on data delivery. For example, the application may prefer certain types of data over others and these types of data may be given priority. Thus step 1530 can be used to establish a delivery schedule where data of type 'A' is delivered immediately while data of type "B" can be delivered at a deferred time.

Figure 16:
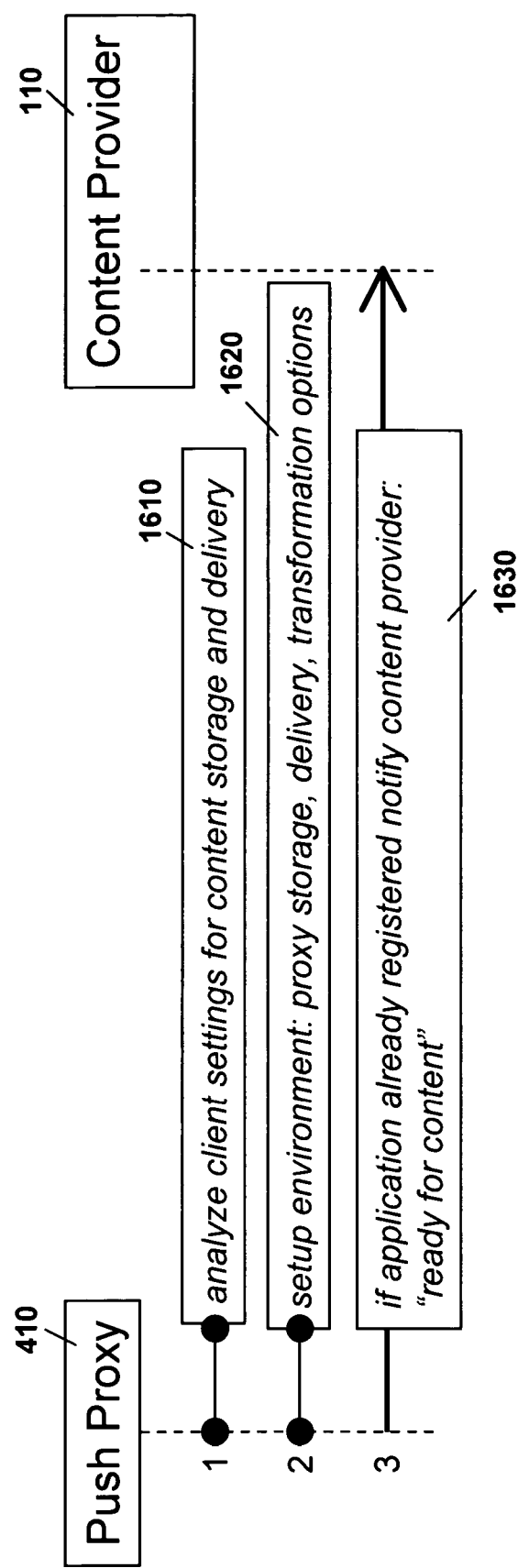
FIG. 16 is a block diagram showing interaction during registration between a push proxy and a content provider.

Reference is now made to FIG. 16. When a content provider 110 registers with a push proxy 410, various steps are performed. A first step 1610 includes analyzing required client settings for content storage and delivery. This can be used, for example, for service advertisement in order to identify push clients 510 on devices capable of consuming content from content provider 110.

A second step 1620 allows push proxy 410 to set up the environment, including proxy storage, delivery options, transformation options, among others.

In step 1630, push proxy 410 can check whether the application is already registered to obtain content from a content provider 110. If this is the case, the application is ready to receive content and a notification from push proxy 410 to content provider 110 that the delivery channel is established and the application is ready for content can be sent.

Step 1630 can occur, for example, if an application is pre-installed on a device prior to content provider 110 coming on-line. Thus, the application is waiting for content provider 110 to become available or the application is of generic type (e.g. a browser or RSS Viewer) and is capable of consuming information from multiple content providers. In an alternative setting, if content provider 110 is already available before the application is installed, the notification step 1530 in FIG. 15 can be used to initiate the content starting to flow from content provider 110 to a client application 150.

As will be appreciated with reference to FIG. 16, client settings can include certain information such as the available storage size used for content partitioning, the queue size used for flow control, delivery scheduling including a push interval, whether the client is retrieving information from the proxy, creating a pseudo-push mode, customization options such as the screen size of a mobile device, among others.

As will be further appreciated, service catalogues may differ for different clients. For example, certain clients may be able to utilize more data, have a different screen size or other conditions which make the client more suitable for a content provider 110 than a device that cannot handle this amount of information, has a smaller screen size, etc. Thus, push proxy 410 can create a service catalogue for specific client applications based on knowledge of those client applications, and only those devices with that client application 150 installed can receive information concerning the content provider.

As will be further appreciated, in some cases the application may be installed based on a service provider and content provider without the user intervention. For example, if content provider 110 registers with push proxy 410, a user of a mobile device may have a contract obligation to accept a certain application. Thus push proxy 410 could notify push client 510 that it is ready to install an application and push the application to push client 510. This could, for example, include a user that has agreed to receive a certain number of ads each month in order to get a preferred rate on their mobile plan. The content provider 110 could be an ad provider and push proxy 410 may therefore push an advertisement displaying application to push client 510, which might be serviced by an application installer registered with push client 410, thereby having the content provider 110 and the service provider 120 entirely driving the process.

The above therefore provides for a plug-in registration model in a push framework where each application or content provider registers and provides an application manifest or service manifest respectively. The application manifest or service manifest is used to establish channel metadata at the push proxy 410 and push client 510 either during registration or subsequently. Thereafter, when an application 150 registers and a content provider 110 registers, content can start flowing between the application 150 and the content provider 110.

With reference to FIGS. 4 and 5, the channel metadata is stored in a channel metadata repository 470 and 570. It is, however, also advantageous to store dynamic metadata on the various processing elements within architecture 100 if the dynamic metadata is repeated. As will be appreciated, this will save processing on the push proxy 410 since current metadata extractor 450 does not need to extract the same metadata over and over. Further, processing by various modules such as content expiry and replacement module 466 or 566 do not need to be updated for each piece of content that is passed. Since push proxy 410 could be working with a large number of push clients 510, this processing saving for each content message could be significant. Further, bandwidth could be saved by not having to pass the metadata over a fixed line between content provider 110 and push proxy 410 or over the air between push proxy 410 and push client 510.

Figure 17:
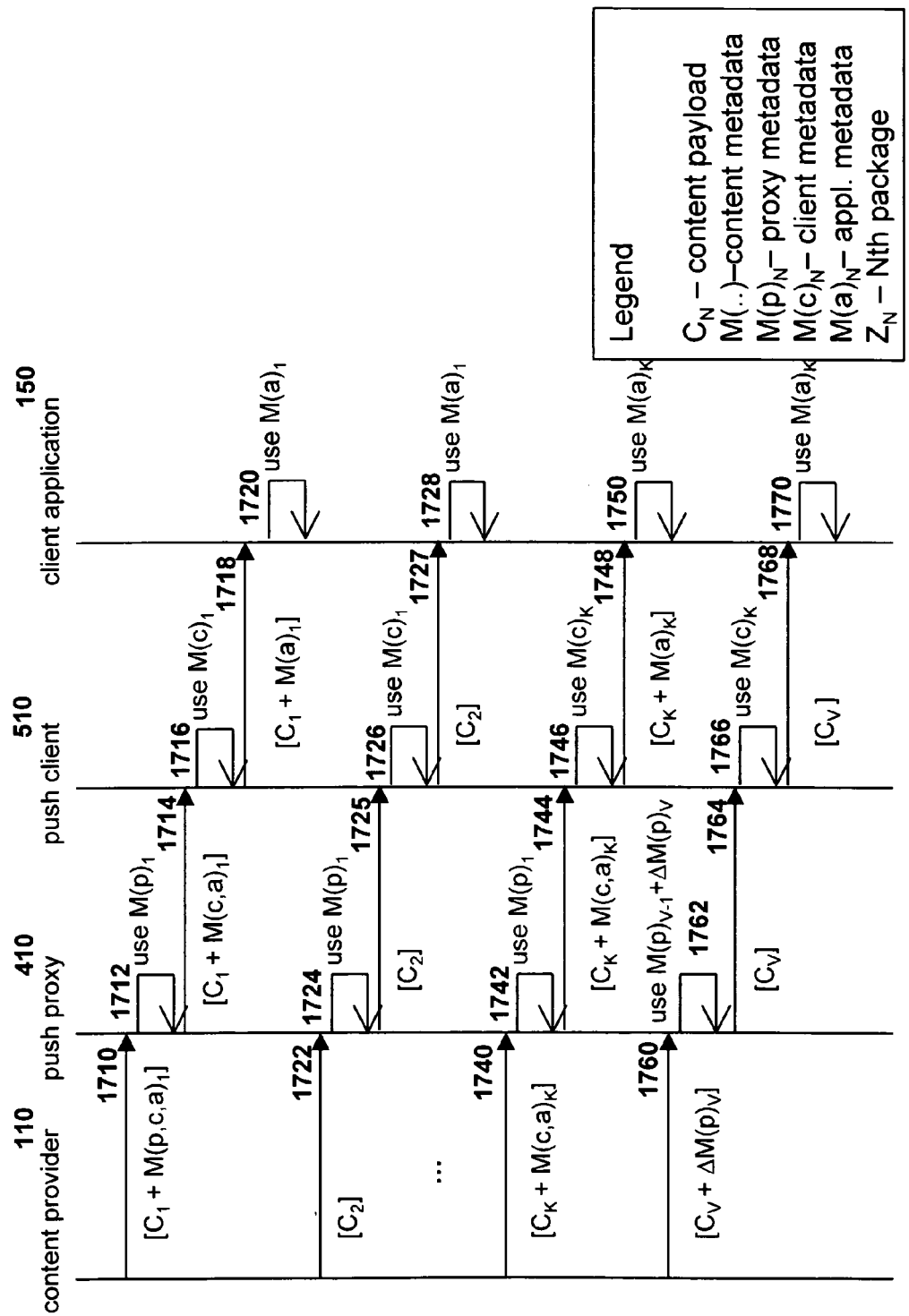
FIG. 17 is a flow diagram showing the flow of content and metadata between a content provider and processing elements.

Reference is now made to FIG. 17. FIG. 17 illustrates an example of run time flow where your last metadata version is stored by the processing element.

As seen in FIG. 17, content provider 110 provides a content envelope which includes content $[C_1+M(p,c,a)_1]$. This means that a first content payload is being sent along with metadata that includes proxy metadata, client metadata and application metadata. This is sent in step 1710.

At step 1712, push proxy 410 uses the proxy metadata as illustrated by the phrase "use $M(p)_1$". Further, in step 1714 the content plus the metadata that includes the client metadata and the application metadata is passed to push client 510.

In step 1716, push client 510 uses the client metadata and further in step 1718, passes the content payload to client application 150. Client application 150 uses, in step 1720 the application metadata and further consumes the content payload.

As seen in step 1722, a second content payload, designated by $C_2$, has the same metadata as the first content payload. Because each processing element, namely, push proxy 410, push client 510 and client application 150, cached the metadata for content provider 110, the metadata does not need to be passed again but instead already resides on the processing element.

Thereafter, in step 1724 the push proxy 410 uses metadata that was previously cached for the push proxy 410. Similarly, in steps 1726 and 1728 the push client 510 uses the client metadata and the client application 150 uses the application metadata respectively. Content is passed, without metadata, in steps 1725 and 1727.

As illustrated in step 1740, content may have new metadata for the push client 510 and client application 150, but may keep the old metadata for the push proxy 410. In this case, the metadata that is passed in step 1740 includes only client metadata and application metadata. In step 1742, the push proxy 410 uses the cached proxy metadata and passes the content payload along with the new client metadata and application metadata in step 1744.

In step 1746, the push client 510 uses the new client metadata that was passed to it and further passes the content payload and application metadata in step 1748.

In step 1750, the client application uses the new application metadata and further consumes the content payload.

As will be appreciated by one skilled in the art, various configurations could exist concerning which metadata has changed and which metadata stays the same, and only the metadata that has changed is passed to the processing element that requires it. As will be appreciated by those skilled in the art, the processing element, if it does not receive new metadata, goes back to the cached metadata that it has stored and uses this on the content payload.

In a further alternative embodiment, incremental changes can also be made to metadata. For example, in step 1760 a new content payload along with a delta metadata version can be passed to service proxy 410. The delta of the proxy metadata can include a difference between the proxy metadata previously passed and the current metadata that the content should be processed with. The push proxy 410 composes the metadata by adding the previous metadata with the delta and then using this to process the content payload in step 1762. Thereafter, since there has been no change, in step 1764 the content payload is sent by itself and in step 1766 the push client 510 uses the previously cached client metadata.

Push client then passes the content payload in step 1768 to client application 150, which uses the previously cached location metadata on the content payload in step 1770 and then it consumes the content payload.

An example of where incremental data may be used is a situation in which a content provider tells the proxy that of the existent fields within the content payload, 30 should be extracted to send to client application 150. In a subsequent transaction, two additional fields that are important for that piece of content payload may be deemed necessary to be passed to the client application 150 by content provider 110. The content provider could therefore, using an incremental change, tell push proxy to extract the two additional fields and add them to the 30 fields that were previously extracted. By only having to pass the delta, i.e. the two additional fields, the processing time for extracting the metadata at push proxy 410 is reduced, thereby optimizing the process.

As will be further appreciated, metadata can come in various forms. It could be compiled such as native code or interpreted code such as Java or C#. The metadata can also be a data/properties file that indicates to use certain properties. In another alternative embodiment, it can be binary content, for example a transformation such as a XSLT transformation on an XML document.

Figure 18:
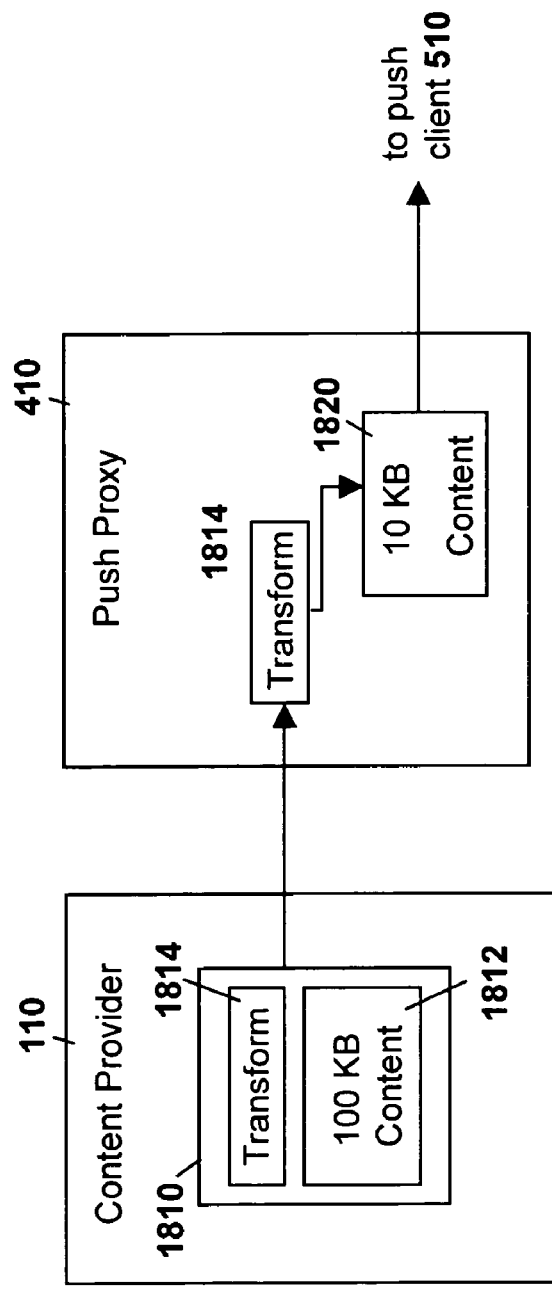
FIG. 18 is block diagram showing an exemplary transform application for content.

The above can be used for various applications to provide intelligence for content being transferred to a specific client application. It can also provide for rich content providers that can provide content for various applications merely based on the metadata that they provide with their data. This can be illustrated by way of example in FIG. 18.

A content provider 110 could, for example, be a on-line bookseller. An application can register with the on-line bookseller to indicate to the on-line bookseller that it wants to be informed of new releases of a specific genre. This could occur on a daily or weekly or monthly basis.

Content provider 110, for example, on a weekly basis will send a content envelope 1810 having a book list 1812, to push proxy 410. It can also send a transform metadata 1814, which can be, for example, a URL link for transforming the specific content based on the application receiving it.

In one embodiment, the book list 1812 could include numerous books, descriptions of each book including the author and a synopsis of the book. The file may, for example, be 100 KB in size.

Push proxy 410 can receive this large file and may realize, based on the client application being serviced, that a transformation to the large content file needs to be done in order to better accommodate the client which may only be able to receive, for example, 10 kilobytes of information. The transformation that is passed as a proxy metadata can therefore be applied to the book list to reduce the book list to a 10 KB modified document 1820. This can, for example, be done by removing the synopsis, ranking the books and only including the top 50 or other transformations as would be evident to those skilled in the art.

Once the transformation is complete, the modified document 1820 is then sent to the push client 510.

Further, the deferred retrieval message store 452, as seen in FIG. 4, can be used to store the extra content that was stripped out in the transformation process.

The advantage of the above is that the bookseller can have one site and send one list to all of its clients. Since various clients will not be mobile wireless clients, the 100 KB file may be appropriate for these clients. By also providing the transformation metadata, the bookseller can have one list that it sends to everyone. As will be appreciated by those skilled in the art, most current web technologies require a separate website for a mobile client, and this is overcome by the above solution.

Figure 19:
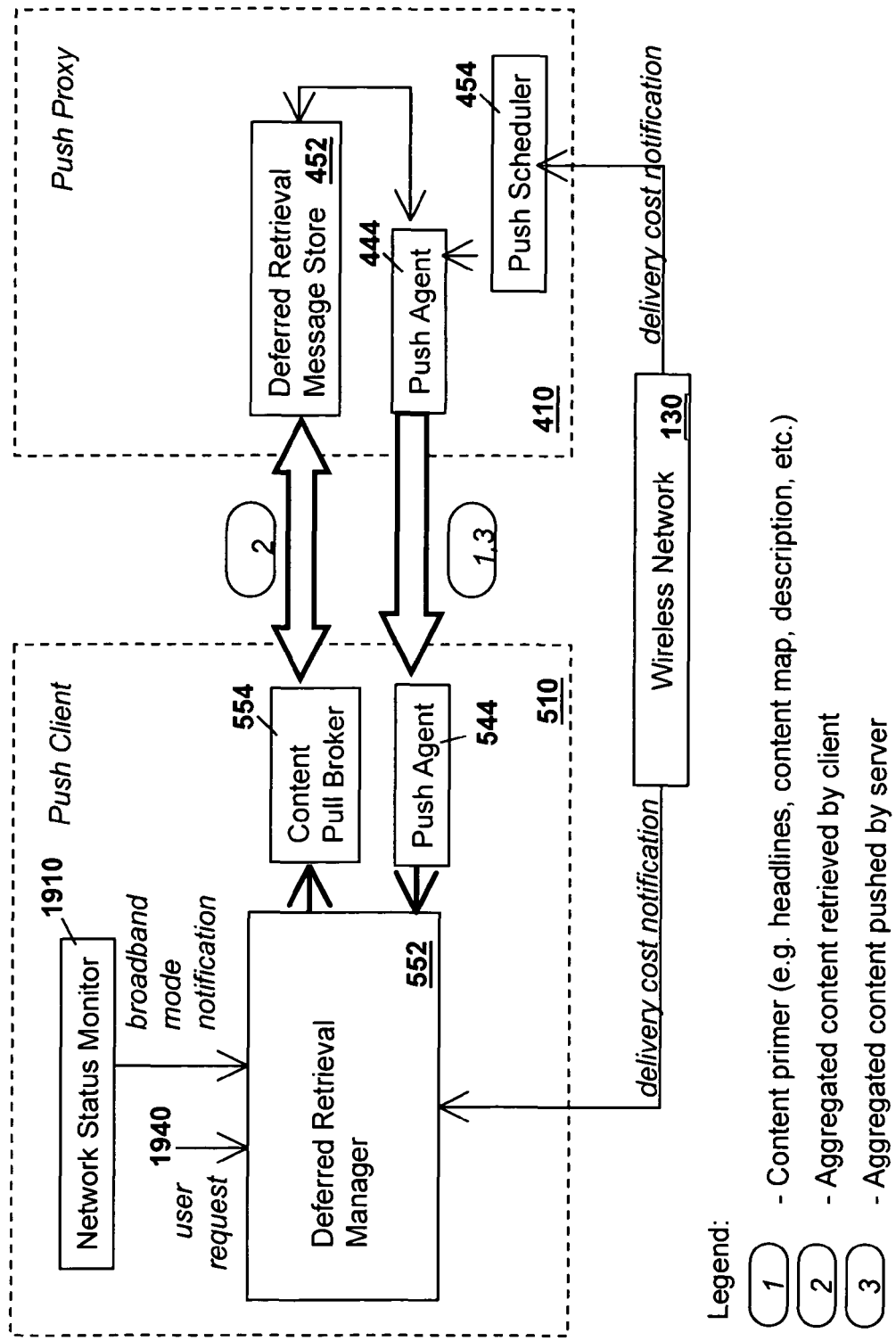
FIG. 19 is a block diagram of a content syndication model.

The above also lends itself to a syndication model and reference is now made to FIG. 19.

As will be appreciated by those skilled in the art, a mobile device may not wish to receive large amounts of data when network conditions are not optimal for the receiving of large amounts of data. Further, network operators may wish to avoid sending large amounts of data during peak periods of bandwidth usage in order to spread network traffic more evenly over time. This can be accomplished using a push/pull model as illustrated in FIG. 19.

As described with reference to FIG. 4 above, content may be provided that includes more information than the user may currently needs. For example, if the user requests location information for restaurants within his area, a service provider may wish to add advertising such as other services available in the area. However, the service provider may not wish to push this additional content immediately to the user, but instead provide a primer such as a headline or a table of contents showing the additional content.

In other situations, the content may be too large to send to the user, and the user may receive only the first part of the content and the remainder of the content is stored in a deferred retrieval message store 452.

Thereafter, the stored content can be passed to push client 510 either by push proxy 410 or when asked for my push client 510.

Push client 510 includes a network status monitor 1910 which can monitor the status of the network. Push client 510 may wish to only receive extra data in certain conditions. For example, on a hybrid mobile device that has a WiFi and a cellular option, it is cheaper to provide data on the WiFi connection, and thus network status monitor 1910 could wait until the push client 510 is connected to a WiFi network prior to getting the deferred content. Alternatively, network status monitor could check whether the client is roaming in a foreign network or connected to the home network in order to minimize roaming charges. Network status monitor may also check to see whether a dedicated data channel is established for the device. One skilled in the art will realize that network status monitor 1910 could also check for various other preconditions in the network before requesting deferred data to be passed to push client 510.

A wireless network 130 could also provide information to either or both of push client 510 and push proxy 410 concerning the costs of delivery of data. As will be appreciated by those skilled in the art, various peak periods occur for the delivery of content. In the case of traffic information, the peak periods may be at the beginning and end of the workday when people are coming to and going from work. For stock quotes the peak period may be during the time that the market is open. Other peak periods will exist. In order to average the data traffic, it may be desirable for the network to charge different rates based on the current data usage in the network. Thus during peak periods a higher rate may be charged than a non-peak period such as the middle of the night. Wireless network 130 therefore provides delivery cost notifications to a deferred retrieval manager 552 on a push client 510 and to push scheduler 454 on push proxy 410.

In one embodiment, data from content provider 110 and passed to push proxy 410 can be ranked based on its importance to the client. Certain information can be designated through metadata to be delivered immediately. Other information can be designated to be delivered when the network cost is less than a first value (for example 10¢ per megabyte) and other data may be designated to be delivered when the network costs drop below a second value (for example, 5¢ per megabyte). Thus push scheduler 454 considers the data that is stored in deferred retrieval message store 452 and instructs push agent 444 to pass deferred data to push agent 544 on push client 510.

Alternatively, deferred retrieval manager 552 could also monitor network conditions as sent from wireless network 130 and if the data rate is below a certain rate can ask content pull broker 554 to pull content from deferred retrieval message store 452.

Alternatively, deferred retrieval manager 552 could see that the network status is favorable for pulling larger amounts of data, such as if the mobile device has connected with a WiFi network, and ask content pull broker 554 to pull the data from deferred retrieval message store 452.

As will be further appreciated, a user can always request to have the content pulled. Thus user request 1940 could also be used to trigger content pull broker 554 to pull the data from deferred retrieval message store 452.

The rules stored in push scheduler 454 and deferred retrieval manager 552 could be static metadata based on a classification of content. The rules could also be based on dynamic metadata for the particular data that has been passed. In this case the content provider 110 has classified the data.

Reference is now made to FIG. 20. As will be appreciated by those skilled in the art, data can be one of two forms, linear or non-linear. Linear data could, for example, be arrays or strings or content that flows in a linear fashion. Non-linear data, conversely, is data that does not linearly relate to each other and can include complex dependencies with content maps or links.

For linear content, fragmentation merely involves the breaking of the data into various components based on linear progression. The data is partitioned into segments and the segments are delivered to the push client 410. As indicated in FIG. 20, fragmentation processor 2010 interacts with content 2012 and decides that the content can be parsed with linear progression. The fragmentation processor 2010 next partitions the data into segments 2014, 2016 and 2018 in the example of FIG. 20, and, as illustrated in FIG. 20, passes the first segment 2014 while deferring the passing of the second and third segments 2016 and 2018 respectively.

The cursor management module 2030 keeps track of which segment has been delivered and delivers the next segment in order.

Referring to FIG. 21, non-linear content needs to be partitioned in a more intelligent way. Further, at the other end, in order to reconstitute the segments, metadata is required.

A fragmentation processor 2110 analyses the content based on a metadata based analysis. These could include keeping certain segments or data elements together if logically required. Fragmentation processor 2110 analyses content 2112 and partitions the content into segments based on logical rules. Each segment includes the content plus metadata including for example, dependencies, maps, and navigation rules for each segment.

Once partitioned, a first segment 2114 is sent to push client 510 and the passing of the remainder of the segments 2116 and 2118 is deferred as illustrated in FIG. 21. Segment navigation block 2130 deals with which segment to send next. As will be appreciated by those skilled in the art, first segment 2114 includes a data portion and a metadata portion. The metadata portion of segment 2114 is a layer of metadata that is added by the fragmentation processor 2110 to indicate to content dependencies module 564 how to reconstitute the content. Data portion of first segment 2114 can include both content and metadata associated with the channel or with the content.

Segment navigation block 2130 is adapted to process how a user travels through the data. For example, if the data is in a tree format and the user goes down a first branch of the tree, segment navigation block 2130 may pass to push client 410 other branches in the tree that can be reached from the element that the user has navigated to.

For example, a tree could include an employee database that has employee names along with a structure for the corporation. Based on FIG. 21, if the user navigates into a specific department of the organization, the segmentation navigation block 2130 might forward the group fragments for groups within that department. If the user then navigates into a specific group within the department, the segmentation navigation block 2130 might then pass information fragments about the employees within that group.

The above therefore requires that the data be partitioned into logical components. Identifiers are assigned to all types and content, and structural information is created passing the information with the primer.

The above therefore provides an architecture for dynamic content delivery that can used with generic systems where applications and content can be added without changing the structure of the system. The content can be tailored to fit the application receiving it, and be fragmented according to the above.

As will be appreciated, the push client and client applications can reside on any mobile device. One exemplary mobile device is described below with reference to FIG. 22. This is not meant to be limiting, but is provided for illustrative purposes.

Figure 22:
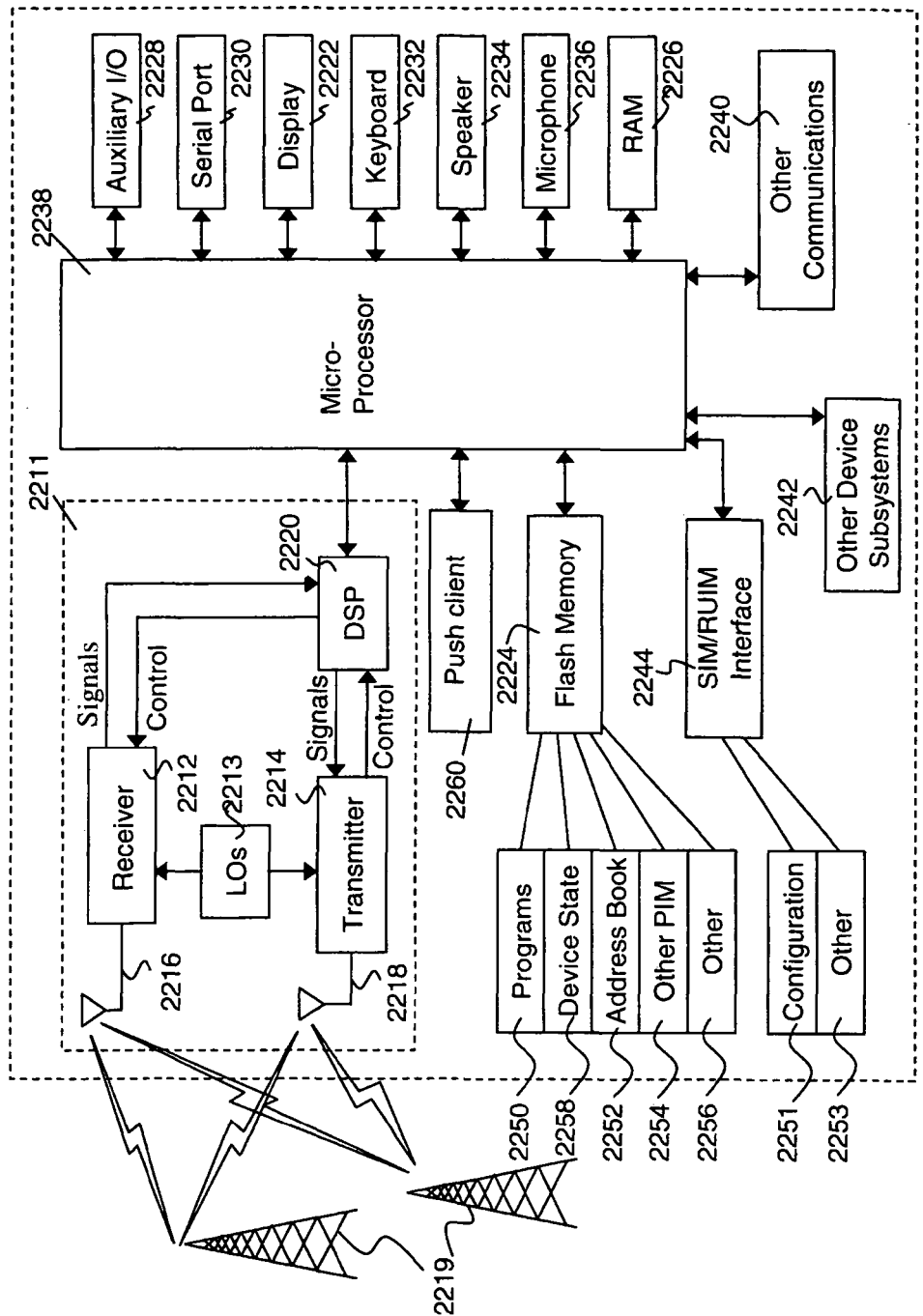
FIG. 22 is a block diagram of an exemplary mobile device that could be used in association with the present method and system.

FIG. 22 is a block diagram illustrating a mobile station apt to be used with preferred embodiments of the apparatus and method of the present application. Mobile station 2200 is preferably a two-way wireless communication device having at least voice and data communication capabilities. Mobile station 2200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 2200 is enabled for two-way communication, it will incorporate a communication subsystem 2211, including both a receiver 2212 and a transmitter 2214, as well as associated components such as one or more, preferably embedded or internal, antenna elements 2216 and 2218, local oscillators (LOs) 2213, and a processing module such as a digital signal processor (DSP) 2220. As will be apparent to those skilled in the field of communications, the particular design of the communication subsystem 2211 will be dependent upon the communication network in which the device is intended to operate.

Network access requirements will also vary depending upon the type of network 2219. In some CDMA networks network access is associated with a subscriber or user of mobile station 2200. A CDMA mobile station may require a removable user identity module (RUIM) or a subscriber identity module (SIM) card in order to operate on a CDMA network. The SIM/RUIM interface 2244 is normally similar to a card-slot into which a SIM/RUIM card can be inserted and ejected like a diskette or PCMCIA card. The SIM/RUIM card can have approximately 64K of memory and hold many key configuration 2251, and other information 2253 such as identification, and subscriber related information.

When required network registration or activation procedures have been completed, mobile station 2200 may send and receive communication signals over the network 2219. As illustrated in FIG. 22, network 2219 can consist of multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device.

Signals received by antenna 2216 through communication network 2219 are input to receiver 2212, which may perform such common receiver functions as signal amplification, frequency down conversion, filtering, channel selection and the like, and in the example system shown in FIG. 22, analog to digital (A/D) conversion. A/D conversion of a received signal allows more complex communication functions such as demodulation and decoding to be performed in the DSP 2220. In a similar manner, signals to be transmitted are processed, including modulation and encoding for example, by DSP 2220 and input to transmitter 2214 for digital to analog conversion, frequency up conversion, filtering, amplification and transmission over the communication network 2219 via antenna 2218. DSP 2220 not only processes communication signals, but also provides for receiver and transmitter control. For example, the gains applied to communication signals in receiver 2212 and transmitter 2214 may be adaptively controlled through automatic gain control algorithms implemented in DSP 2220.

Mobile station 2200 preferably includes a microprocessor 2238 which controls the overall operation of the device. Communication functions, including at least data and voice communications, are performed through communication subsystem 2211. Microprocessor 2238 also interacts with further device subsystems such as the display 2222, flash memory 2224, random access memory (RAM) 2226, auxiliary input/output (I/O) subsystems 2228, serial port 2230, two or more keyboards or keypads 2232, speaker 2234, microphone 2236, other communication subsystem 2240 such as a short-range communications subsystem and any other device subsystems generally designated as 2242. Serial port 2230 could include a USB port or other port known to those in the art.

Some of the subsystems shown in FIG. 22 perform communication-related functions, whereas other subsystems may provide "resident" or on-device functions. Notably, some subsystems, such as keyboard 2232 and display 2222, for example, may be used for both communication-related functions, such as entering a text message for transmission over a communication network, and device-resident functions such as a calculator or task list.

Operating system software used by the microprocessor 2238 is preferably stored in a persistent store such as flash memory 2224, which may instead be a read-only memory (ROM) or similar storage element (not shown). Those skilled in the art will appreciate that the operating system, specific device applications, or parts thereof, may be temporarily loaded into a volatile memory such as RAM 2226. Received communication signals may also be stored in RAM 2226.

As shown, flash memory 2224 can be segregated into different areas for both computer programs 2258 and program data storage 2250, 2252, 2254 and 2256. These different storage types indicate that each program can allocate a portion of flash memory 2224 for their own data storage requirements. Microprocessor 2238, in addition to its operating system functions, preferably enables execution of software applications on the mobile station. A predetermined set of applications that control basic operations, including at least data and voice communication applications for example, will normally be installed on mobile station 2200 during manufacturing. Other applications could be installed subsequently or dynamically.

A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 2219. In a preferred embodiment, the PIM data items are seamlessly integrated, synchronized and updated, via the wireless network 2219, with the mobile station user's corresponding data items stored or associated with a host computer system. Further applications may also be loaded onto the mobile station 2200 through the network 2219, an auxiliary I/O subsystem 2228, serial port 2230, short-range communications subsystem 2240 or any other suitable subsystem 2242, and installed by a user in the RAM 2226 or preferably a non-volatile store (not shown) for execution by the microprocessor 2238. Such flexibility in application installation increases the functionality of the device and may provide enhanced on-device functions, communication-related functions, or both. For example, secure communication applications may enable electronic commerce functions and other such financial transactions to be performed using the mobile station 2200.

In a data communication mode, a received signal such as a text message or web page download will be processed by the communication subsystem 2211 and input to the microprocessor 2238, which preferably further processes the received signal for output to the display 2222, or alternatively to an auxiliary I/O device 2228. A push client 2260, which could be equivalent to push clients 140 and 510, could also process the input.

A user of mobile station 2200 may also compose data items such as email messages for example, using the keyboard 2232, which is preferably a complete alphanumeric keyboard or telephone-type keypad, in conjunction with the display 2222 and possibly an auxiliary I/O device 2228. Such composed items may then be transmitted over a communication network through the communication subsystem 2211.

For voice communications, overall operation of mobile station 2200 is similar, except that received signals would preferably be output to a speaker 2234 and signals for transmission would be generated by a microphone 2236. Alternative voice or audio I/O subsystems, such as a voice message recording subsystem, may also be implemented on mobile station 2200. Although voice or audio signal output is preferably accomplished primarily through the speaker 2234, display 22422 may also be used to provide an indication of the identity of a calling party, the duration of a voice call, or other voice call related information for example.

Serial port 2230 in FIG. 22, would normally be implemented in a personal digital assistant (PDA)-type mobile station for which synchronization with a user's desktop computer (not shown) may be desirable, but is an optional device component. Such a port 2230 would enable a user to set preferences through an external device or software application and would extend the capabilities of mobile station 2200 by providing for information or software downloads to mobile station 2200 other than through a wireless communication network. The alternate download path may for example be used to load an encryption key onto the device through a direct and thus reliable and trusted connection to thereby enable secure device communication. As will be appreciated by those skilled in the art, serial port 2230 can further be used to connect the mobile device to a computer to act as a modem.

Other communications subsystems 2240, such as a short-range communications subsystem, is a further optional component which may provide for communication between mobile station 2200 and different systems or devices, which need not necessarily be similar devices. For example, the subsystem 2240 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method performed by a delivery server, the method comprising:
   receiving, from a content provider, a package consisting of nested envelopes, the nested envelopes being: a client envelope including a payload and client metadata; and
   a server envelope containing the client envelope and server metadata, wherein the client metadata is opaque to the delivery server for instructing only a delivery client how to process the payload, and wherein the server metadata is distinct or different from the client metadata, the server metadata instructing only the delivery server how to process at least one of the client envelope, the payload and the client metadata;

extracting the server metadata from the package consisting of nested envelopes, the server metadata specifying network preferences for delivery of the client envelope to the delivery client; and delivering, to the delivery client, the client envelope containing the payload and the client metadata if network conditions correspond to the network preferences from the server metadata.

2. The method of claim 1, wherein said network preferences are based on a price of delivery for various network types.

3. The method of claim 1, wherein said network preferences are based on bandwidth restrictions for various network types.

4. The method of claim 1, wherein said server metadata specifies a rule regarding whether delivery is acceptable during roaming.

5. The method of claim 1, wherein said server metadata specifies acceptable network types.

6. The method of claim 1 wherein the client metadata contained in the client envelope is configured for extraction and use by only the delivery client.

7. The method of claim 6 wherein the client envelope further includes metadata for extraction and use by only an application which is registered with the delivery client.

8. A method performed by a delivery client, the method comprising:

receiving, from a delivery server, a package consisting of nested envelopes, the nested envelopes being: a content envelope including a payload; and a client envelope containing the content envelope and client metadata, wherein the client metadata is opaque to the delivery server for instructing only the delivery client how to process the content envelope or the payload;

extracting the client metadata from the package consisting of nested envelopes, the client metadata specifying network preferences for the delivery client to obtain content; and using the client metadata to request content from the delivery server according to the network preferences.

9. The method of claim 8, wherein said network preferences are based on a price of delivery for various network types.

10. The method of claim 8, wherein said network preferences are based on bandwidth restrictions for various network types.

11. The method of claim 8, wherein said client metadata specifies a rule regarding whether delivery is acceptable during roaming.

12. The method of claim 8, wherein said client metadata specifies acceptable network types.

13. The method of claim 8 wherein the content envelope further includes metadata for extraction and use by only an application which is registered with the delivery client.

14. A method performed by a content provider, the method comprising:

packaging, at the content provider, first metadata with a content envelope that includes a payload such that a delivery client envelope is formed containing the first metadata and the content envelope, the first metadata being opaque to a delivery server for extraction from the delivery client envelope only by a delivery client and for use by only the delivery client; and nesting, at the content provider, the delivery client envelope in second metadata such that a delivery server envelope containing the second metadata and the delivery client envelope is formed, the second metadata being opaque to the delivery client for extraction from the delivery server envelope only by the delivery server and for use by only the delivery server, wherein the delivery server envelope contains the delivery client envelope, and the delivery client envelope contains the content envelope, and wherein at least one of the first metadata and the second metadata specifies preferences which facilitate selection of a network for delivery of content.

15. The method of claim 14 wherein the first metadata is configured for use by only the delivery client to facilitate processing of the content envelope, and wherein the second metadata is configured for use by only the delivery server to facilitate processing of the delivery client envelope.

16. The method of claim 14 wherein at least one of the first metadata or the second metadata includes information related to expiring or replacing the payload before the payload is consumed by an application registered with the delivery client.

17. The method of claim 14 wherein the content envelope further includes third metadata with the payload, the third metadata being configured to provide instructions regarding processing of the payload to an application that is registered with the delivery client.

18. A non-transitory storage medium containing instructions which cause a machine to perform a delivery server method comprising:

receiving, from a content provider, a package consisting of nested envelopes, the nested envelopes being: a client envelope including a payload and client metadata; and a server envelope containing the client envelope and server metadata, wherein the client metadata is opaque to the delivery server for instructing only a delivery client how to process the payload, and wherein the server metadata is distinct or different from the client metadata, the server metadata instructing only the delivery server how to process at least one of the client envelope, the payload and the client metadata;

extracting the server metadata from the package consisting of nested envelopes, the server metadata specifying network preferences for delivery of the client envelope to the delivery client; and delivering, to the delivery client, the client envelope containing the payload and the client metadata if network conditions correspond to the network preferences from the server metadata.

19. A non-transitory storage medium containing instructions which cause a machine to perform a delivery client method comprising:

receiving, from a delivery server, a package consisting of nested envelopes, the nested envelopes being: a content envelope including a payload; and a client envelope containing the content envelope and client metadata, wherein the client metadata is opaque to the delivery server for instructing only the delivery client how to process the content envelope or the payload;

extracting the client metadata from the package consisting of nested envelopes, the client metadata specifying network preferences for the delivery client to obtain content; and using the client metadata to request content from the delivery server according to the network preferences.

20. A non-transitory storage medium containing instructions which cause a machine to perform a content provider method comprising:

packaging, at the content provider, first metadata with a content envelope that includes a payload such that a delivery client envelope is formed containing the first metadata and the content envelope, the first metadata being opaque to a delivery server for extraction from the delivery client envelope only by a delivery client and for use by only the delivery client; and nesting, at the content provider, the delivery client envelope in second metadata such that a delivery server envelope containing the second metadata and the delivery client envelope is formed, the second metadata being opaque to the delivery client for extraction from the delivery server envelope only by the delivery server and for use by only the delivery server, wherein the delivery server envelope contains the delivery client envelope, and the delivery client envelope contains the content envelope, and wherein at least one of the first metadata and the second metadata specifies preferences which facilitate selection of a network for delivery of content.

* * * * *